United States Patent [19]

Sono

[11] Patent Number: 5,829,044
[45] Date of Patent: Oct. 27, 1998

[54] FILING APPARATUS FILING SYSTEM FILE PROCESSING METHOD AND PROGRAM CONTAINING FILE PROCESSING METHOD

[75] Inventor: Koichi Sono, Hiratsuka, Japan

[73] Assignee: Canon Kabushiki Kaisha, Tokyo, Japan

[21] Appl. No.: 690,995

[22] Filed: Aug. 1, 1996

[30] Foreign Application Priority Data

Aug. 2, 1995 [JP] Japan .................................... 7-215497

[51] Int. Cl.⁶ .................................................. G06F 12/00
[52] U.S. Cl. ......................... 711/156; 711/165; 711/154; 711/162; 711/159
[58] Field of Search ................................. 395/610, 800, 395/511, 439; 382/284; 348/390; 711/112, 156

[56] References Cited

U.S. PATENT DOCUMENTS

| 4,817,050 | 3/1989 | Komatsu et al. | 395/610 |
| 4,942,542 | 7/1990 | Yamakawa | 382/284 |
| 5,159,692 | 10/1992 | Imai et al. | 395/800 |
| 5,276,805 | 1/1994 | Hamaguchi | 395/511 |
| 5,359,365 | 10/1994 | Enokida | 348/390 |
| 5,404,479 | 4/1995 | Yamamoto | 395/439 |
| 5,428,393 | 6/1995 | Enokida | 348/390 |
| 5,489,941 | 2/1996 | Enokida | 348/390 |

*Primary Examiner*—Tod R. Swann
*Assistant Examiner*—Fred F. Tzeng
*Attorney, Agent, or Firm*—Fitzpatrick, Cella, Harper & Scinto

[57] ABSTRACT

A large volume of images can be stored without sacrificing the fast retrieval of frequently used images of the images stored in a storage medium. A filing apparatus includes a first storage unit for storing an image, a second storage unit of fast access type having a smaller memory capacity than that of the first storage unit, a retrieval information storage unit for storing retrieval information for retrieving images stored in the first and second storage units and a control unit for transferring the image stored in the second storage unit to the first storage unit in response to the reading of the image from the first storage unit by the retrieval information.

11 Claims, 37 Drawing Sheets

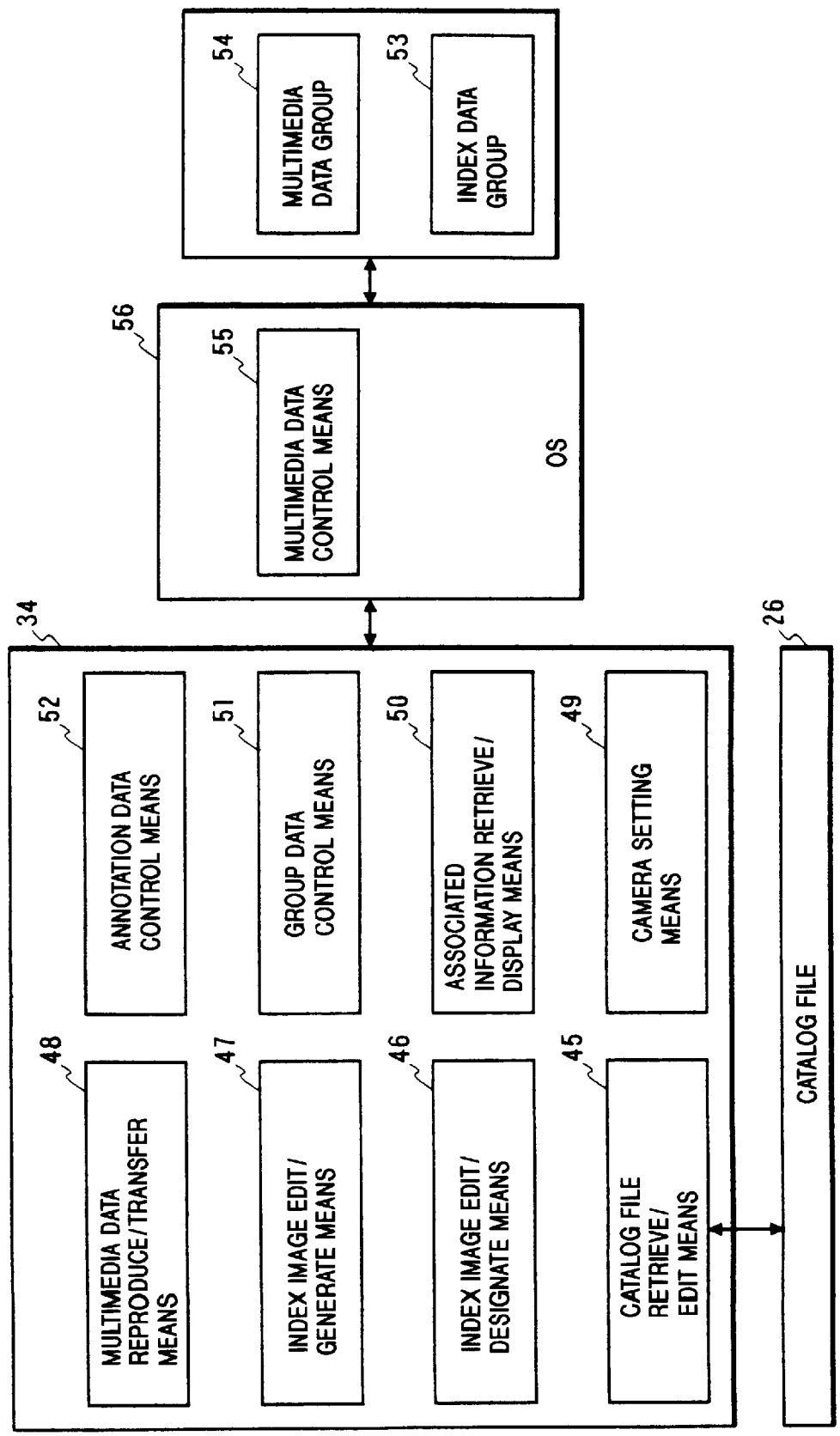

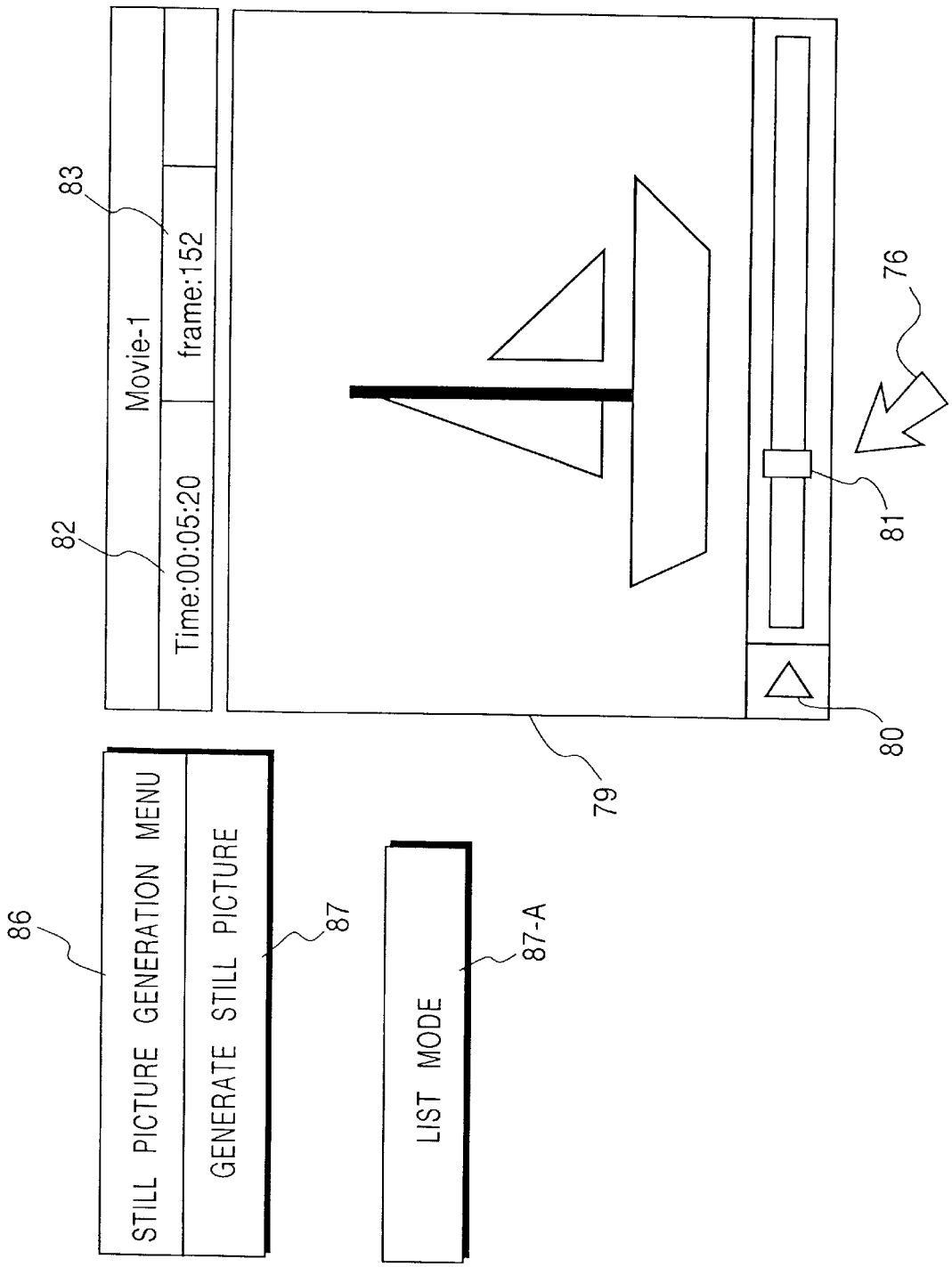

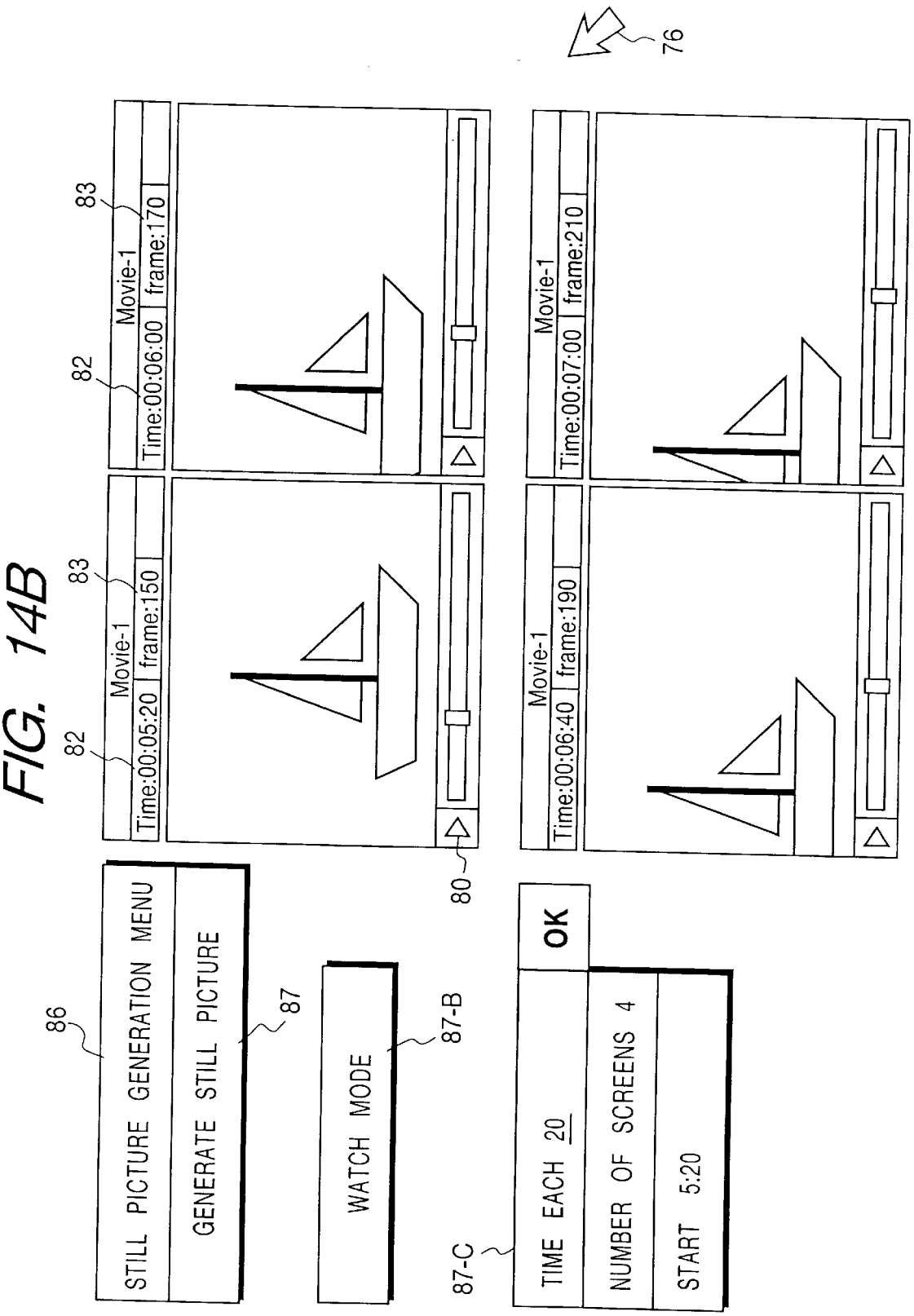

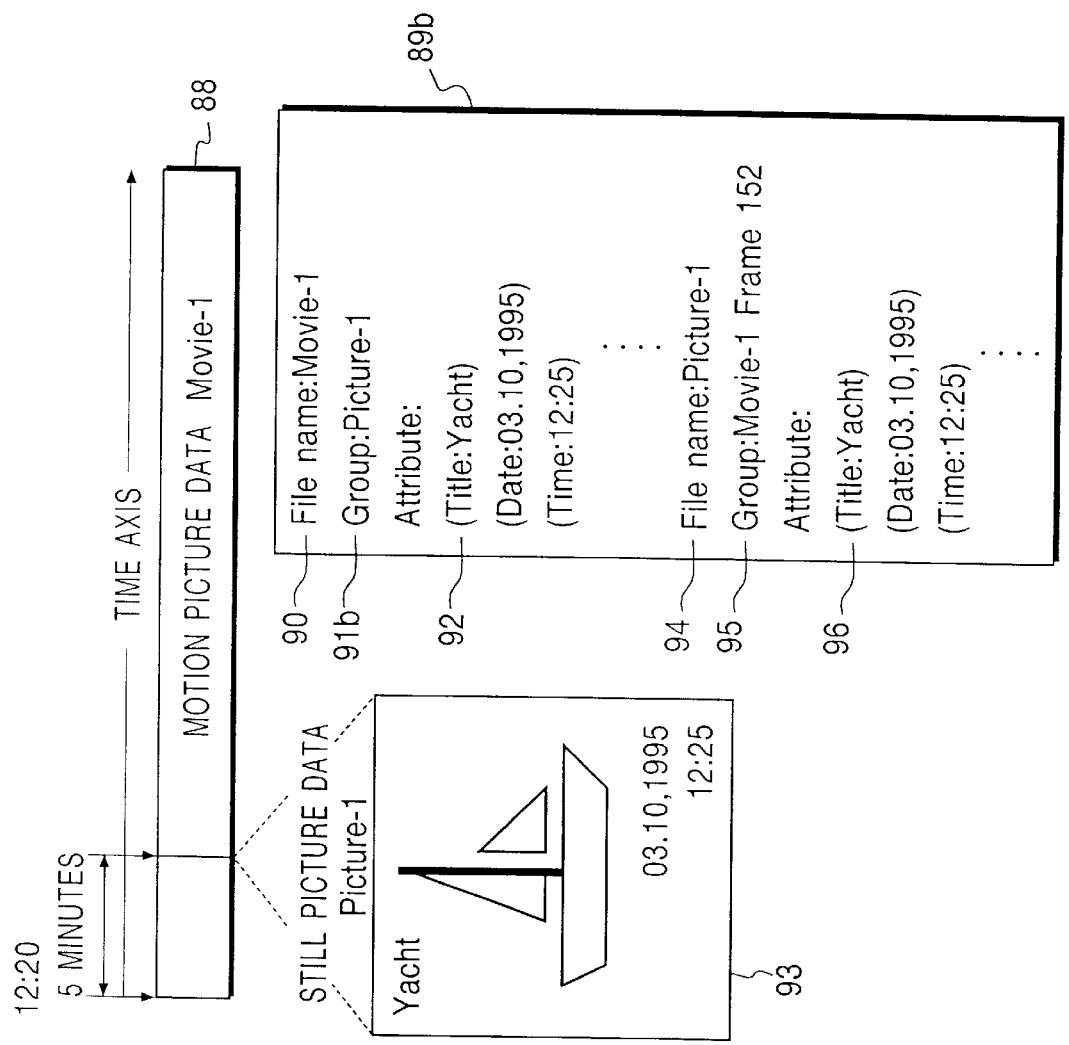

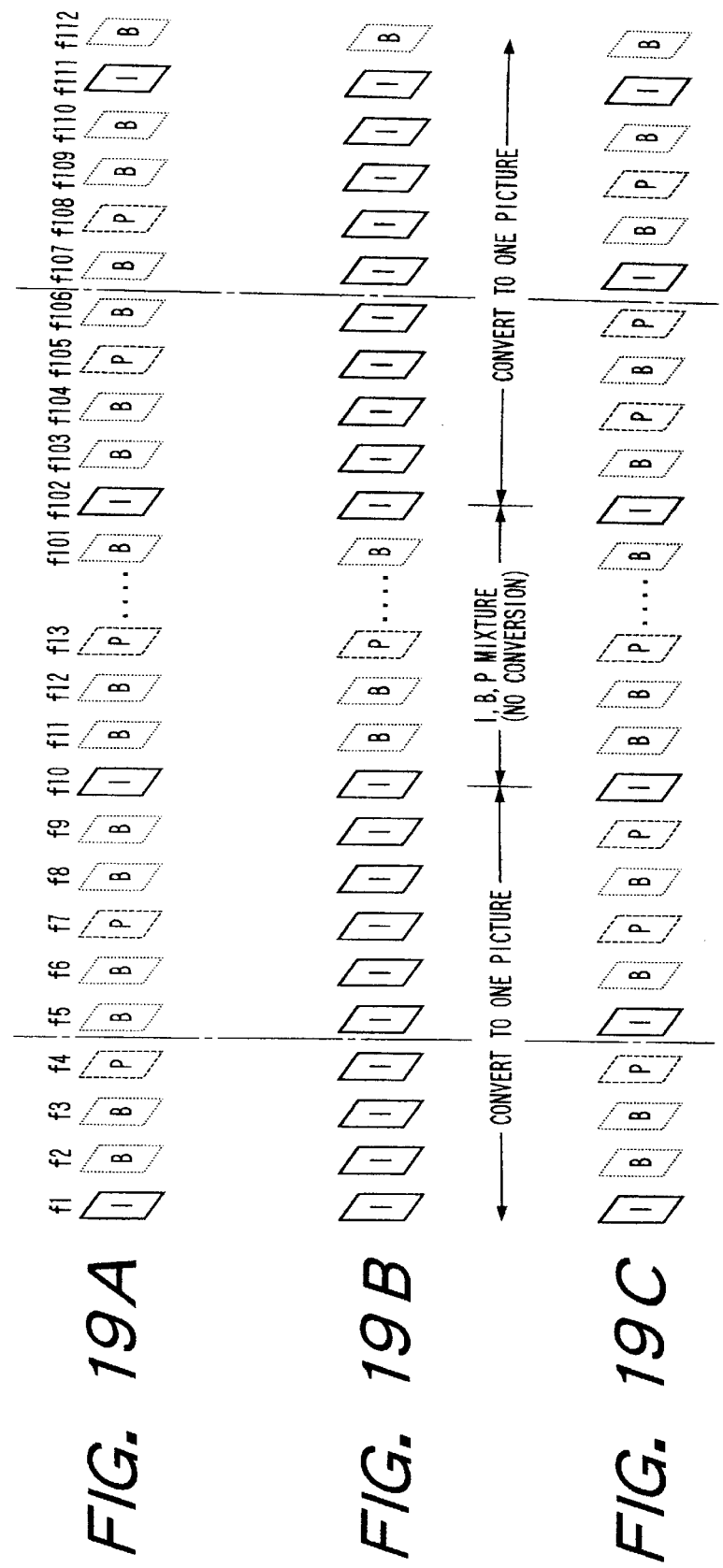

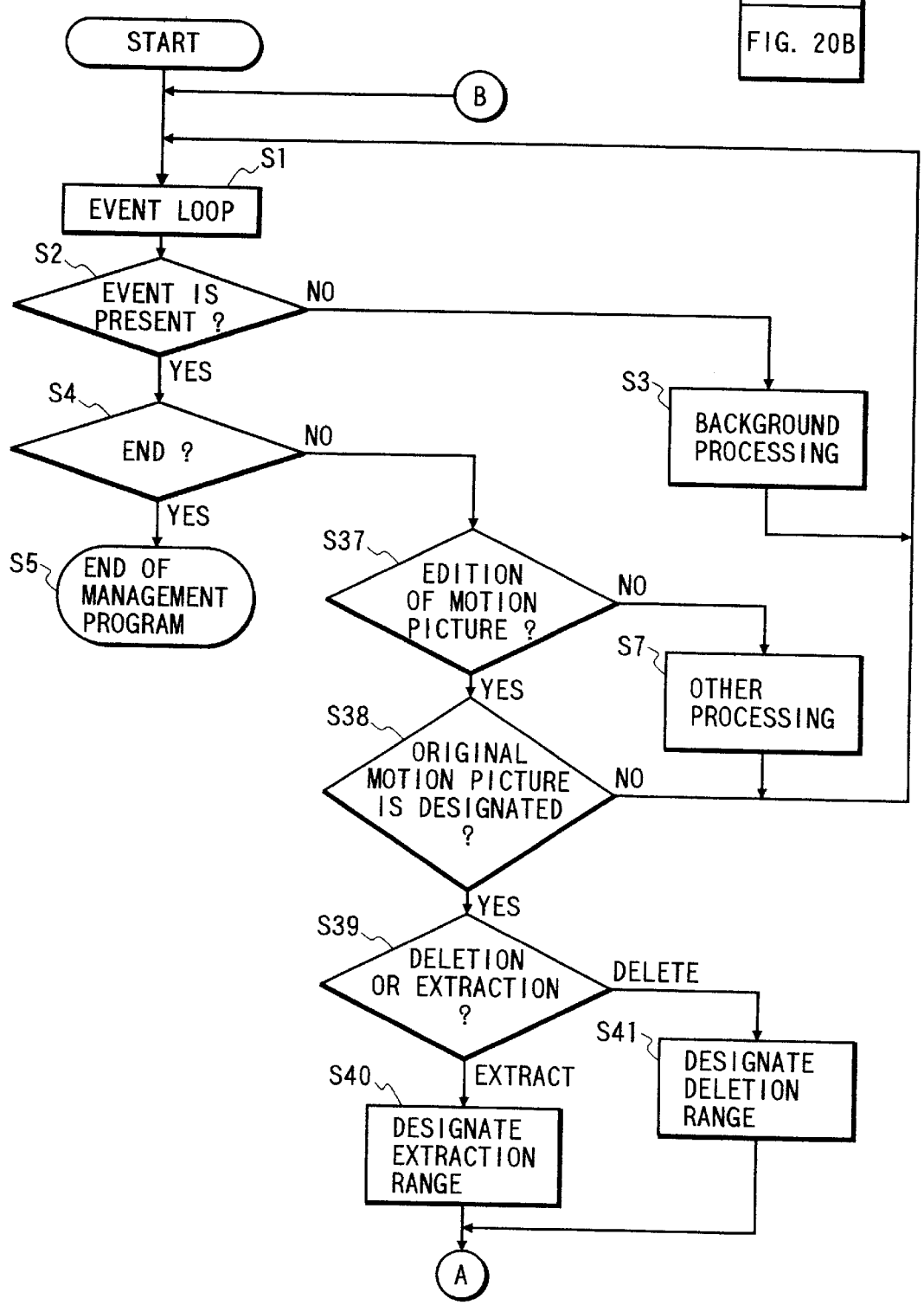

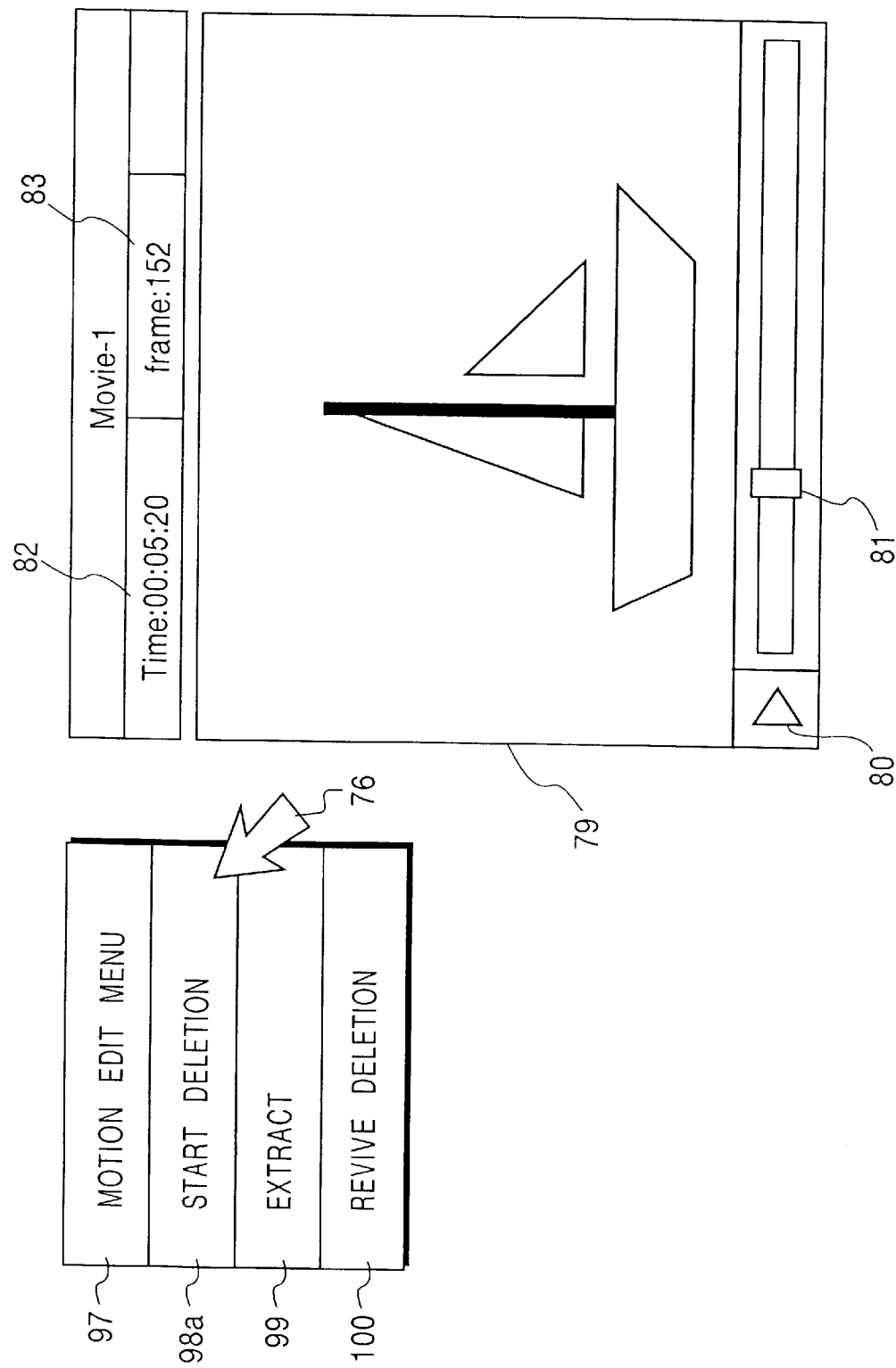

FIG. 21B
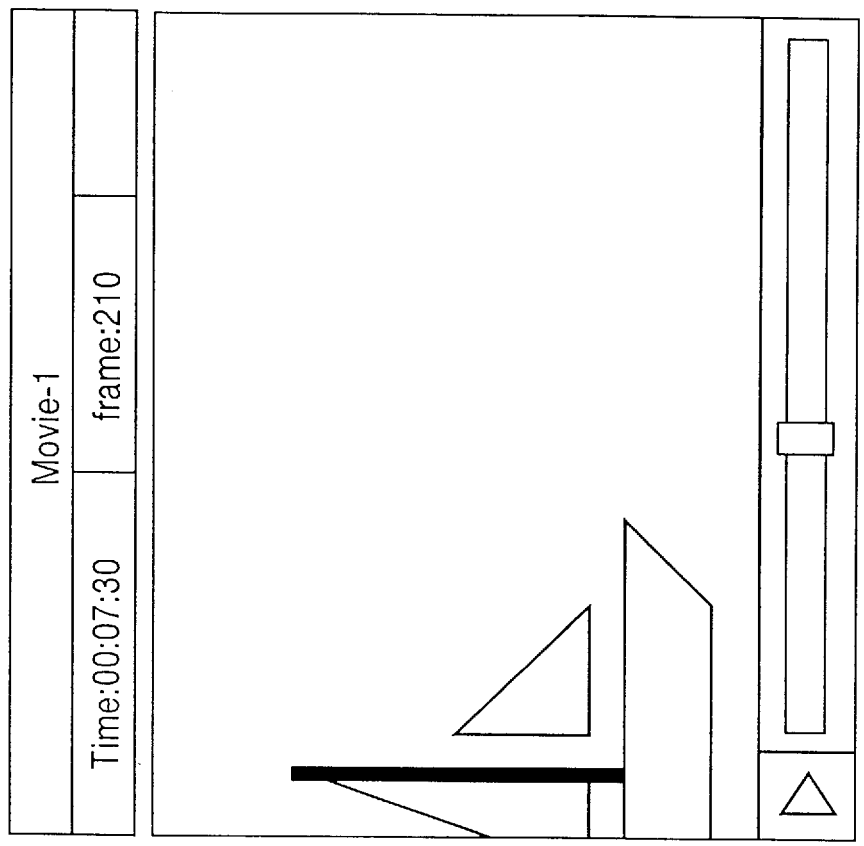
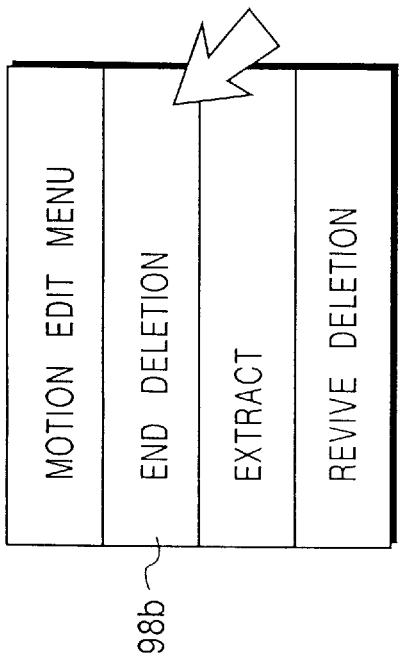

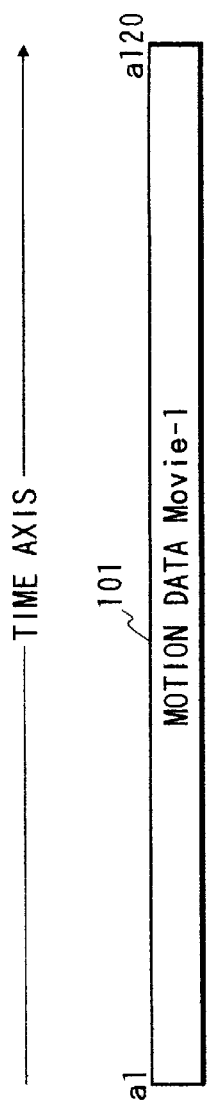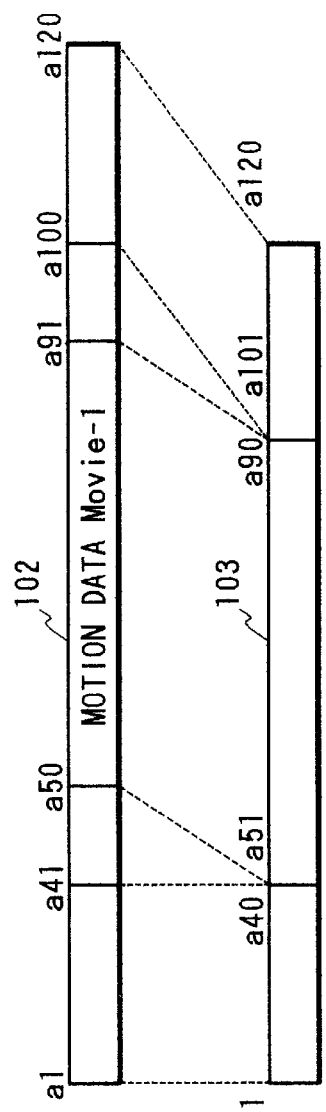
FIG. 22A
FIG. 22B
FIG. 22C

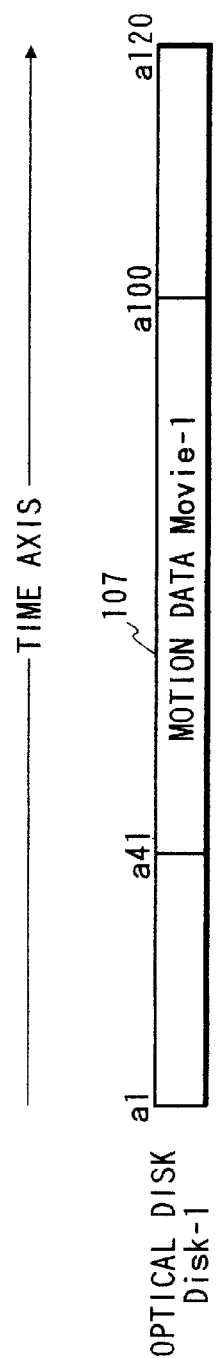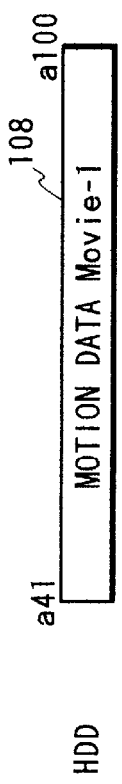
FIG. 24A
FIG. 24B

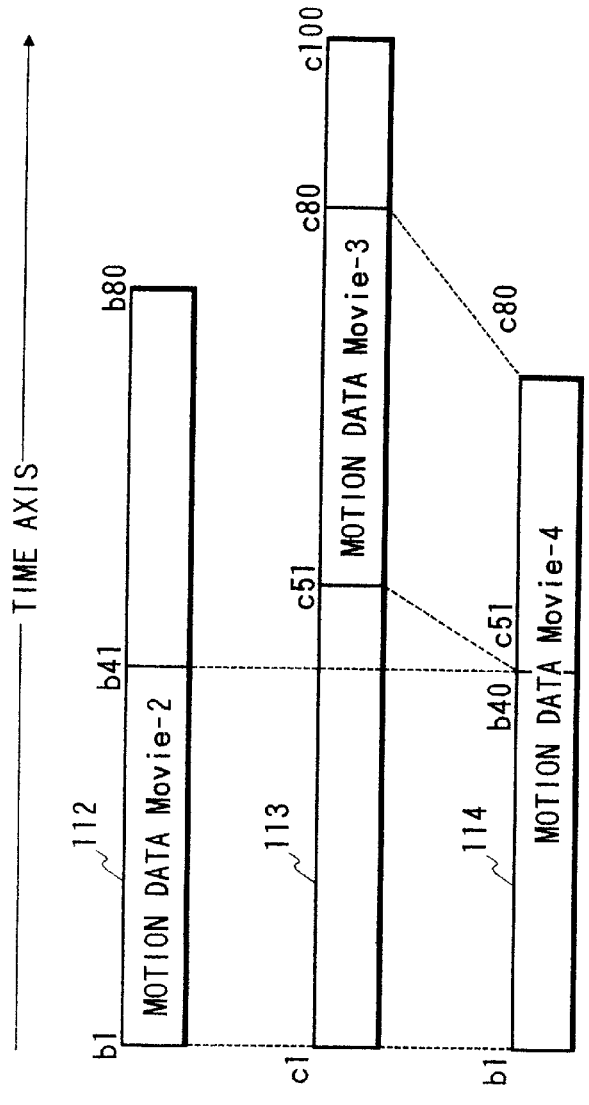

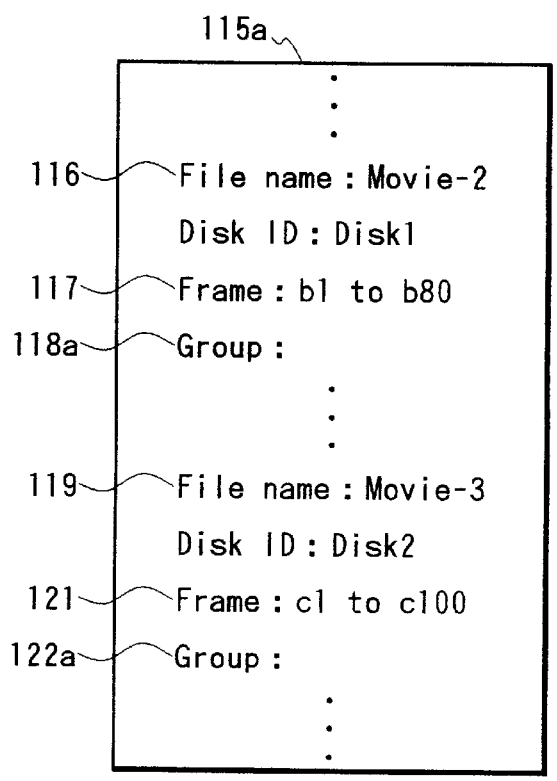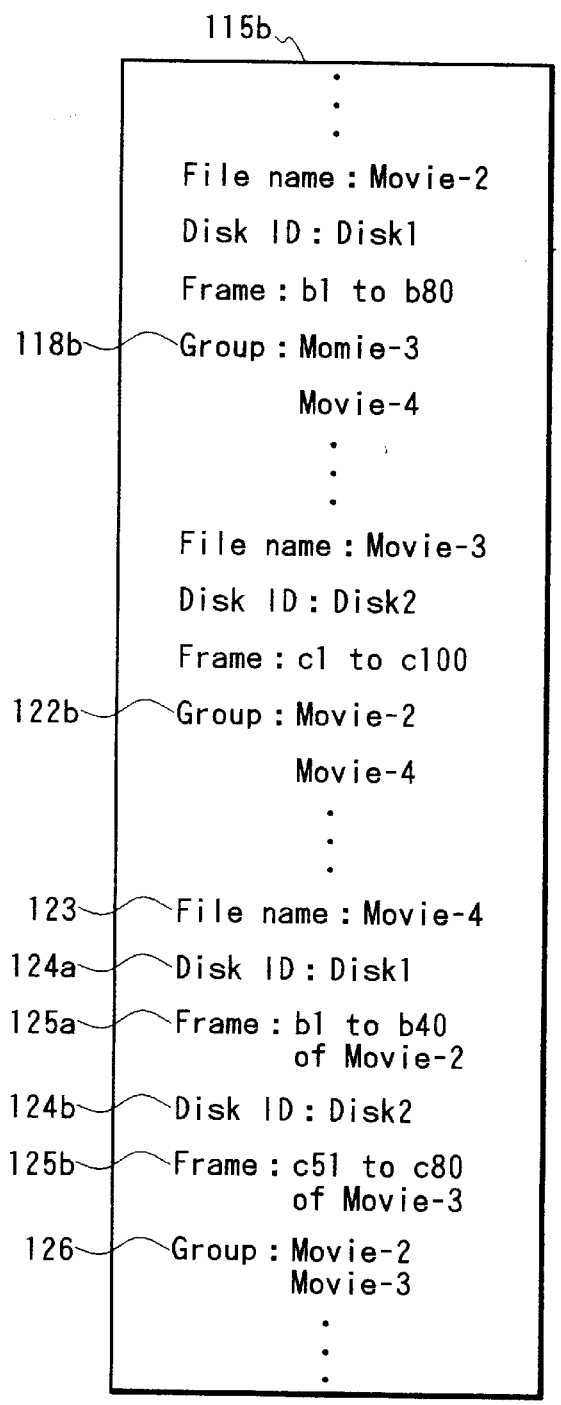
FIG. 28A
FIG. 28B

FIG. 29

Title:Mt.Fuji          02.19,1995

S:1/125   F:8.0   EF28mm

FILING APPARATUS FILING SYSTEM FILE PROCESSING METHOD AND PROGRAM CONTAINING FILE PROCESSING METHOD

BACKGROUND OF THE INVENTION

1. Field of the Invention

The present invention relates to filing apparatus, filing system, file processing method and program containing file processing method for storing, managing, retrieving and sorting multimedia data such as image, sound and text converted to digital signals.

2. Related Background Art

With recent advancement of digital signal processing technologies and computer the chronologies, a system for processing an image signal such as a still image and a motion picture image and a sound signal as digital signals has been becoming popular.

As input means therefor a digital camera device has been known and a still image and a motion picture image compressed by JPEG system and MPEG system can be stored in a hard disk drive or a PCMCIA standard memory card in the digital camera device. Further, a photo CD which records an image picked up in an analog system on an optical disk after converting it to a digital signal.

In the prior art, the multimedia data transferred from the digital camera device is saved in storage means attached to a personal computer system such as hard disk drive or an optical disk drive and managed under a file management system of a conventional operating system which is common to other data files and program files.

In the prior art file management system, however, has the following problems. Namely, when the multimedia data is to be edited, a storage medium such as a hard disk drive which permits high speed updating is suitable because the updating of data takes place frequently, but since the image data, particularly the motion picture data requires a large storage capacity (for example, 10 MB/min for MPEG1 (320×240× 30 fps)), a large space of the storage device is occupied and the shortage of storage capacity readily occurs with the hard disk.

When a removable medium such as an optical disk is used, the shortage of the storage capacity may be compensated by exchanging the removable medium to provide a large capacity memory, but the multimedia files are scattered into a plurality of removable areas and it is difficult to retrieve required data. Further, the multimedia data which runs across a plurality of removable disks cannot be directly handled by the conventional OS file management system. Further, the optical disk is lower in read/write speed than the hard disk and it is not appropriate for a temporary storage during the data edit work.

Further, when the data is registered from the digital camera device to the multimedia data filing system, it is required for a user to record which data has been registered and which data has not been registered, and the selection and the registration of the data must be manually done.

Further, when one frame is extracted from the motion picture data as a still image and it is registered, the user is required to manually register associated information of image pickup condition of the original motion picture data, to the still image as reference information. When the association of the source motion picture data and the extracted still image is needed, it must be manually done. In order to delete a portion of motion picture or sound data or combining a plurality of data to create new data while retaining the original data, it is necessary to create the new data separately from the original data and a large capacity of recording memory is required.

SUMMARY OF THE INVENTION

It is an object of the present invention to provide filing apparatus, filing system, file processing method and program containing the file processing method which solve the above problems.

It is other object of the present invention to provide filing apparatus, filing system, file processing method and program containing the file processing method which are convenient to use.

In order to solve the above problems, in accordance with one aspect of the present invention, there is provided a filing apparatus comprising first storage means for storing an image, second storage means of fast access type having a smaller memory capacity than that of the first storage means, retrieval information storage means for storing retrieval information for retrieving images stored in the first and second storage means, and control means for transferring the image stored in the second storage means to the first storage means in response to the reading of the image from the first storage means by the retrieval information.

It is other object of the present invention to provide filing apparatus, filing system, file processing method and program containing the file processing method which have novel functions.

The features of the present invention will be apparent from the following description of the invention and the accompanying drawings.

BRIEF DESCRIPTION OF THE DRAWINGS

FIG. 4 shows a block diagram of a configuration of a management program 34, FIGS. 14A and 14B illustrate images realized by the management program 34 when a scene to be extracted from the motion picture image as the still image is designated, FIGS. 15A and 15B illustrate a data structure and an update status of the catalog file when the still image is extracted from the motion picture data, FIGS. 19A to 19C illustrate a frame structure of the motion picture data compressed in the digital form and a status to convert the compression system of the frame of the boundary of the extracted frame area when a portion of the compressed motion picture data is extracted, FIGS. 21A and 21B illustrate images realized by the management program 34 when the motion picture data is edited, FIGS. 22A to 22C illustrate data structures when a portion of the motion picture data is deleted, extracted or edited, FIGS. 24A and 24B illustrate data structures when a41 to a100 of the motion picture data 101 of FIG. 22A are extracted and only the extracted areas are reproduced, FIGS. 27A to 27C illustrate data structures when at least a portion of the plurality of motion picture data is combined, FIGS. 28A and 28B illustrate a catalog file when the combined data of FIGS. 27A to 27C is prepared, FIG. 29 illustrates an image pickup condition of the digital camera.

DETAILED DESCRIPTION OF THE PREFERRED EMBODIMENTS

The preferred embodiments of the multimedia data filing system of the present invention are now explained.

First Embodiment

Figure 1:
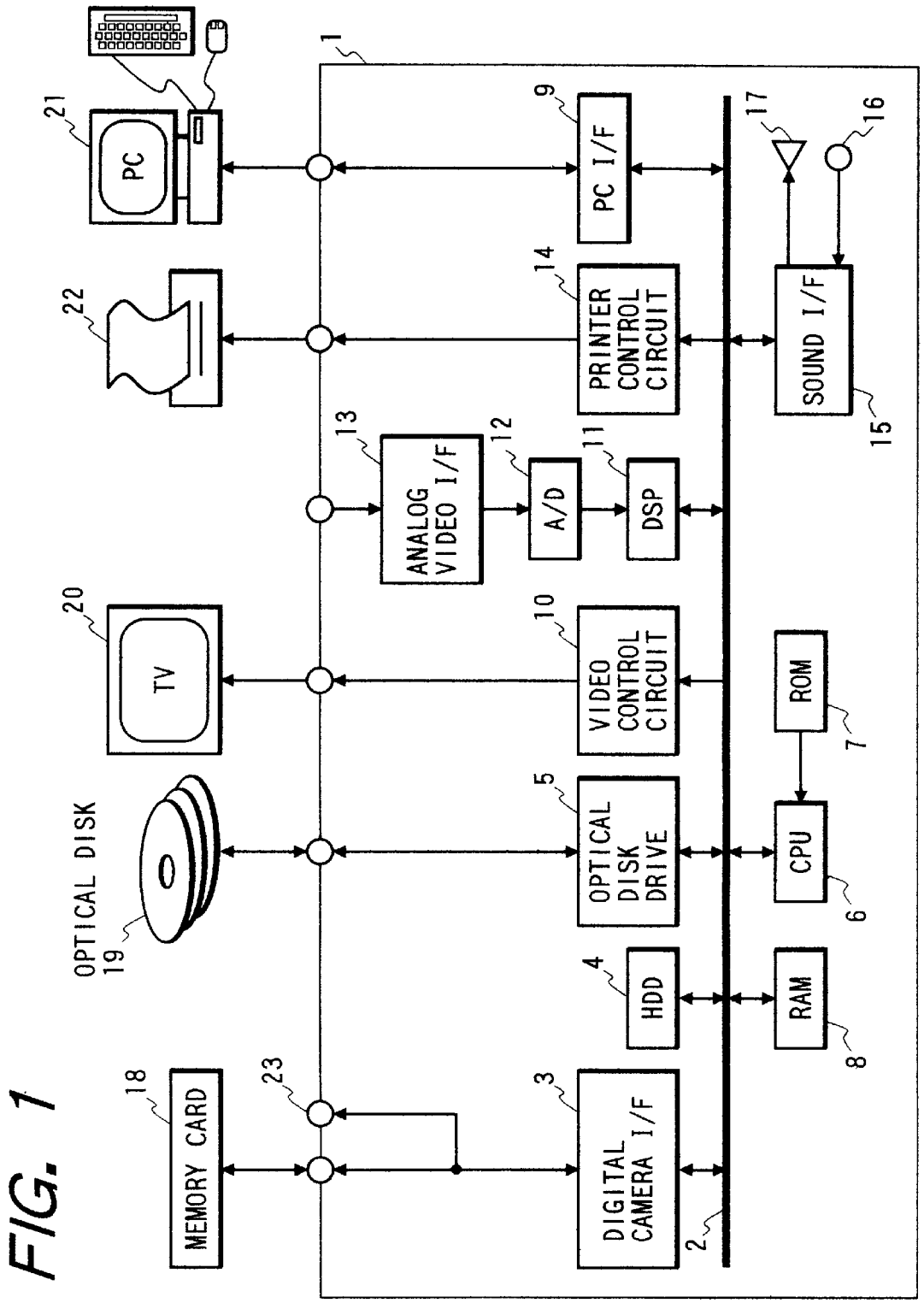
FIG. 1 shows a block diagram of a configuration of a multimedia data filing system in accordance with a first embodiment.

FIG. 1 shows a block diagram of a configuration of the multimedia data filing system in accordance with a first embodiment.

In FIG. 1, numeral 1 denotes a multimedia data filing system, numeral 2 denotes data bus and control signal bus lines, numeral 3 denotes a digital camera I/O interface, numeral 4 denotes a hard disk drive (HDD), numeral 5 denotes an optical disk drive for driving a removable optical disk, numeral 6 denotes a CPU for managing respective blocks to process data in line with various flowcharts to be described later, numeral 7 denotes a ROM for storing an operating system of the multimedia data filing system and programs, numeral 8 denotes a RAM used to temporarily store data to be processed by the CPU 6, numeral 9 denotes an interface circuit for connecting a personal computer and the data bus 2, and numeral 10 denotes a video control circuit for displaying image data on a display unit such as a CRT.

Numeral 11 denotes a DSP (digital signal processing) circuit for conducting processing such as compression/decompression, enlargement/reduction, aspect ratio conversion and format conversion of the multimedia data, numeral 12 denotes an A/D converter for converting an analog video signal to a digital signal, and numeral 13 denotes an interface circuit for receiving an analog video signal.

Numeral 14 denotes a printer control circuit for outputting the image data to a printer, numeral 15 denotes a sound interface circuit for connecting a microphone 16 and a speaker 17 to the data bus 2, numeral 18 denotes a memory card for transferring the multimedia data from the digital camera, numeral 19 denotes a removable optical disk driven by the optical disk drive 5, numeral 20 denotes a display unit, numeral 21 denotes a personal computer, numeral 22 denotes a printer, and numeral 23 denotes a connection terminal for connecting the digital camera through a cable.

In the multimedia data filing system 1 of the above configuration, all multimedia (mm) data including a still image, a motion picture image and sound are transferred to the respective blocks through the data bus 2.

A management program, a catalog file and a plurality of multimedia data are stored in the HDD 4. The management program manages or controls the multimedia data. The catalog file stores retrieval information, associated information of data and attribution information including index image data or icon data by reduced still images representing general aspects for all multimedia data inputted to the multimedia data filing system 1 and stored in the optical disk 19. A plurality of multimedia data of the above multimedia data are ones recently inputted to the multimedia data filing system 1 or recently selected.

All multimedia data are recorded on the optical disk 19. When all registration data cannot be recorded in one optical disk, a plurality of optical disks are used by selecting one by one to record all multimedia data.

Figure 2:
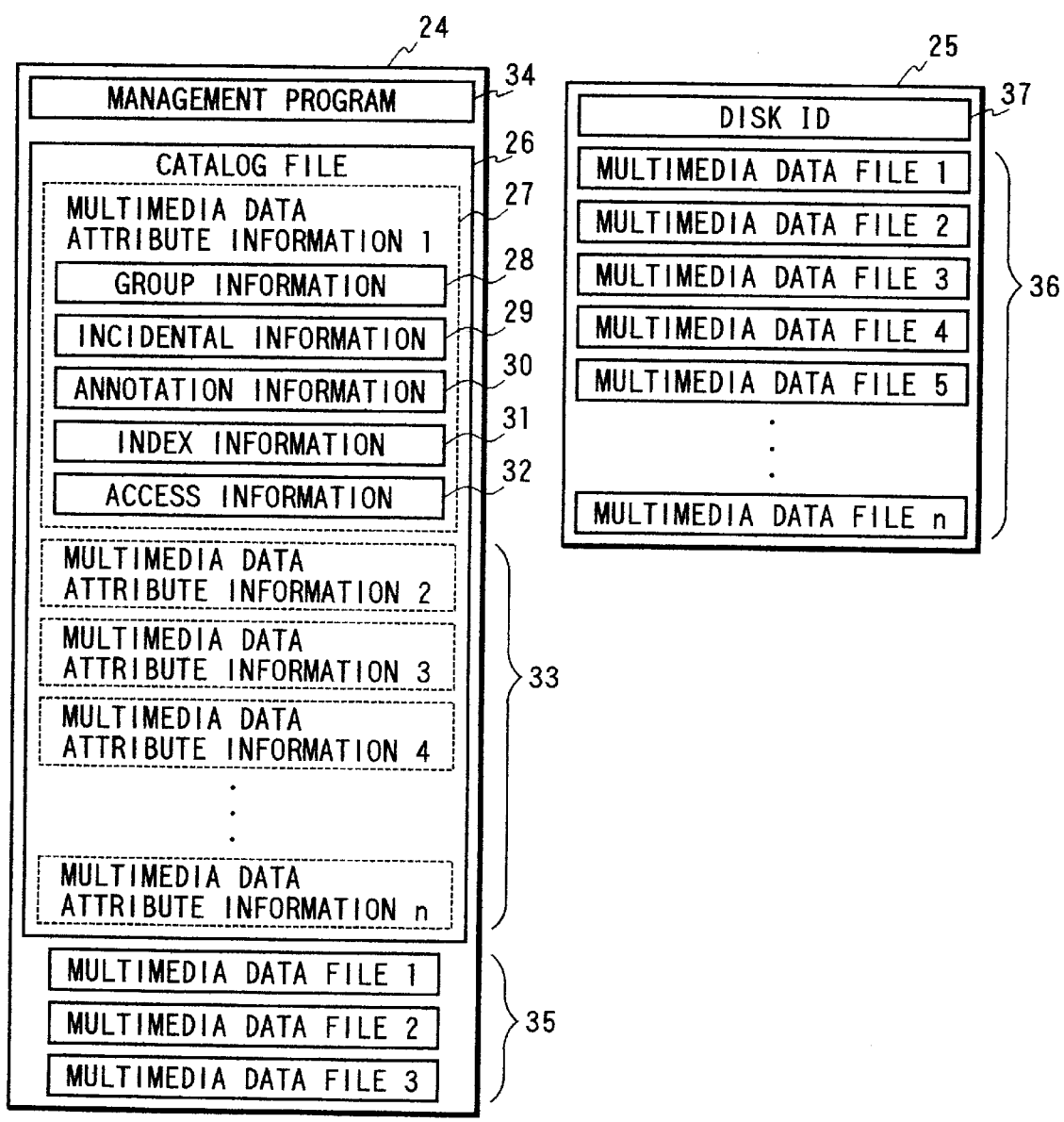
FIG. 2 illustrates contents of data and file stored in an HDD 4, a memory card 18 and an optical disk 19.

FIG. 2 illustrates contents of data and files stored in the HDD 4, the memory card 18 and the optical disk 19. Numeral 24 denotes a content of the HDD 4 or the memory card 18.

Numeral 26 denotes a catalog file which stores attribute information of all multimedia data inputted to the multimedia data filing system. Numeral 27 denotes mm data attribution information (hereinafter attribute information) and a content thereof. Numeral 28 denotes group information for displaying a plurality of image data as a series of motion picture or a set of photographs. Numeral 29 denotes association information such as image data pickup date and time, a shutter speed and an iris value. Numeral 30 denotes annotation information for reproducing sound data or text simultaneously with the image data as explanation of the image data or background music, numeral 31 denotes an index image which is a reduced still image representing a general aspect of the multimedia data, and numeral 32 denotes access information for storing a storage location of the data.

The attribute information 27 for the multimedia data inputted to the multimedia data filing system 1 are stored in the catalog file as shown by 33 in FIG. 2. Numeral 34 denotes a management program. Numeral 35 denotes a multimedia data group recently accessed in the multimedia data filing system 1.

Numeral 25 denotes a content of the optical disk 19 as described above. Numeral 36 denotes n multimedia data groups stored in the optical disk 19. Numeral 37 denotes identification information unique to the optical disk 19.

The HDD 4 and the memory card 18 have the same file format. When the digital camera itself has a storage device capable of storing a plurality of frames of multimedia data, the file format thereof is preferably same as the content 24. The multimedia data comprises the main data such as motion picture, still image and sound and the attribute information described in the catalog file. The content of the access information 32 differs depending on the type of the multimedia data, for example, motion picture, still image or sound.

Figure 3:
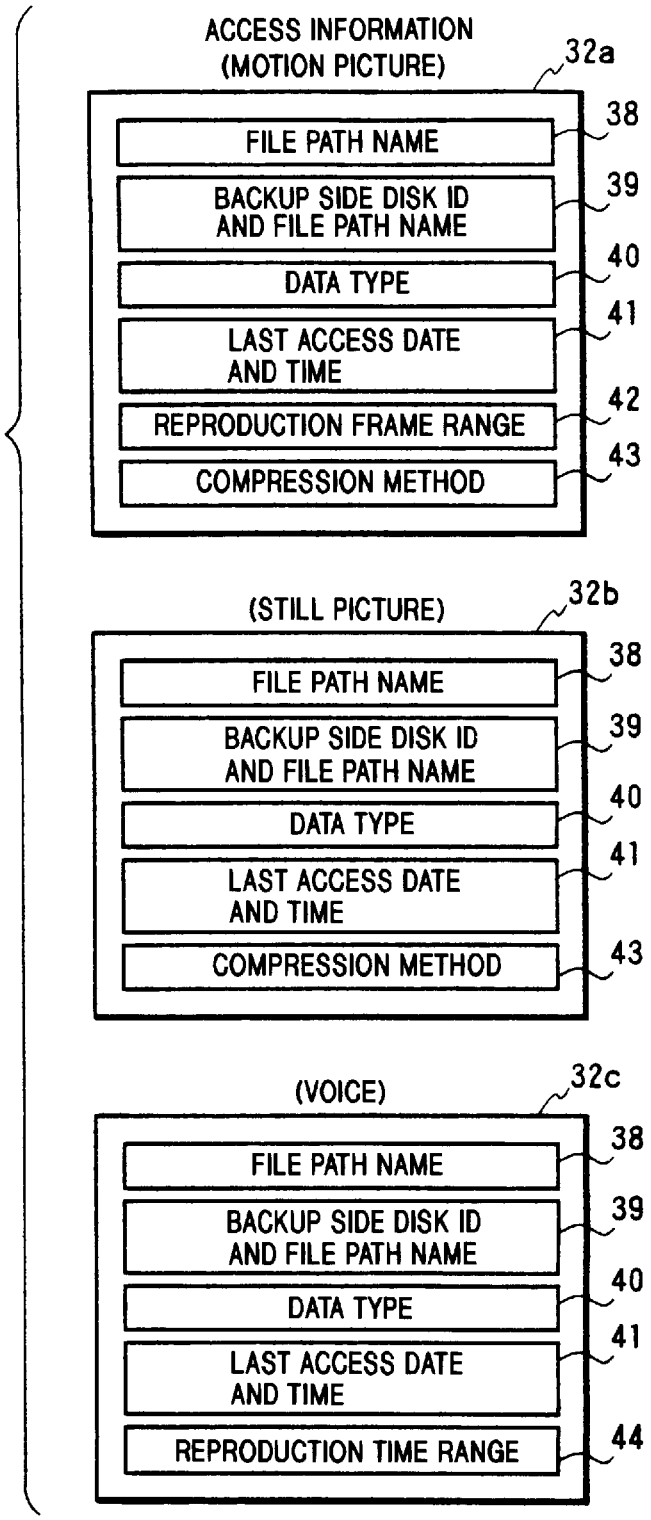
FIG. 3 illustrates a content of access information 32.

FIG. 3 illustrates a content of the access information 32. In FIG. 3, numeral 32a denotes motion picture access information, numeral 32b denotes still image access information and numeral 32c denotes sound access information. Each of the motion picture still image and sound access information 32a, 32b and 32c includes storage location information (file path name) 38 for extracting the multimedia data, identification information (ID) of a backup optical disk and storage location information (file path name) 39, data type identification information 40 for indicating motion picture, still image or sound and last access date and time 41. Numeral 42 denotes a reproduction frame range for the motion picture multimedia data, numeral 43 denotes a data compression system for the motion picture of the still image, and numeral 44 denotes a reproduction time range for the sound data.

In the present embodiment, a hard disk drive of high speed access type is used although it may be substituted by a semiconductor memory.

Further, the optical disk and the optical disk drive are used to drive the large capacity and removable storage medium although a disk changer drive capable of driving a plurality of optical disks or magnetic tape media may be used.

FIG. 4 shows a block diagram of a configuration of the management program 34. The management program 34 comprises catalog file retrieval/edit means 45, index image display/designation means 46, index image edit/preparation means 47, multimedia data reproduction/transfer means 48, camera setting means 49, associated information retrieval/display means 50, group data control means 51 and annotation data control means 52.

Numeral 53 denotes an index data group stored in the HDD 4 and numeral 54 denotes a multimedia data file group comprising 36 and 37 of FIG. 2.

Numeral 55 denotes multimedia data control means in the operating system (OS) 56 of the multimedia data filing system 1. The multimedia control means 55 has basic functions of transferring of the multimedia data through the data bus 2, recording and deleting to and from the respective disk drives and displaying and reproducing in the respective output devices.

Figures 5, 5A:
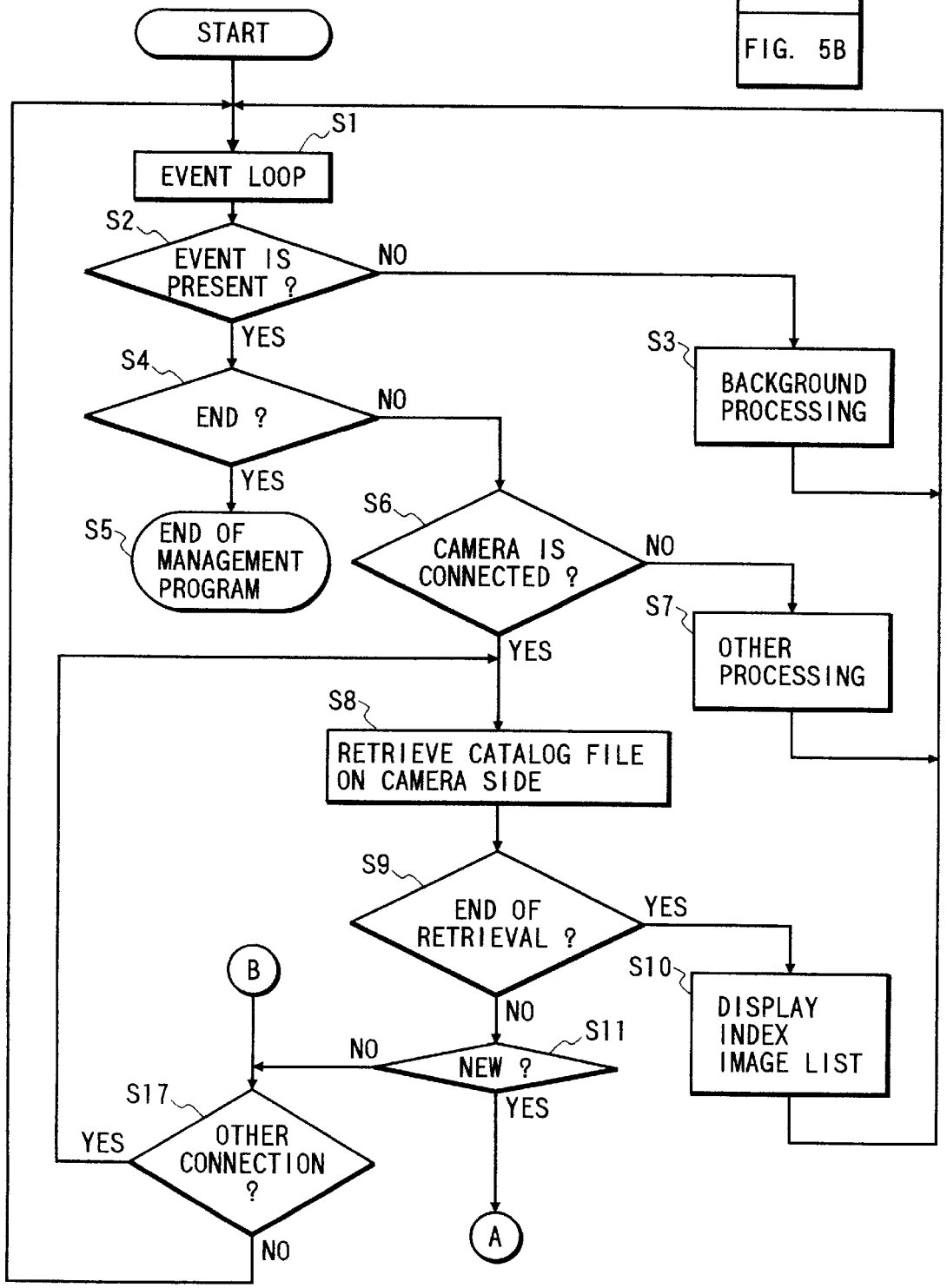
FIG. 5 is comprised of FIGS. 5A and 5B showing flow-charts of a process for automatically backing up new multimedia data to a multimedia data filing system 1 when the memory card 18 is connected or a digital camera is connected to a connection terminal 23.
Figure 5B:
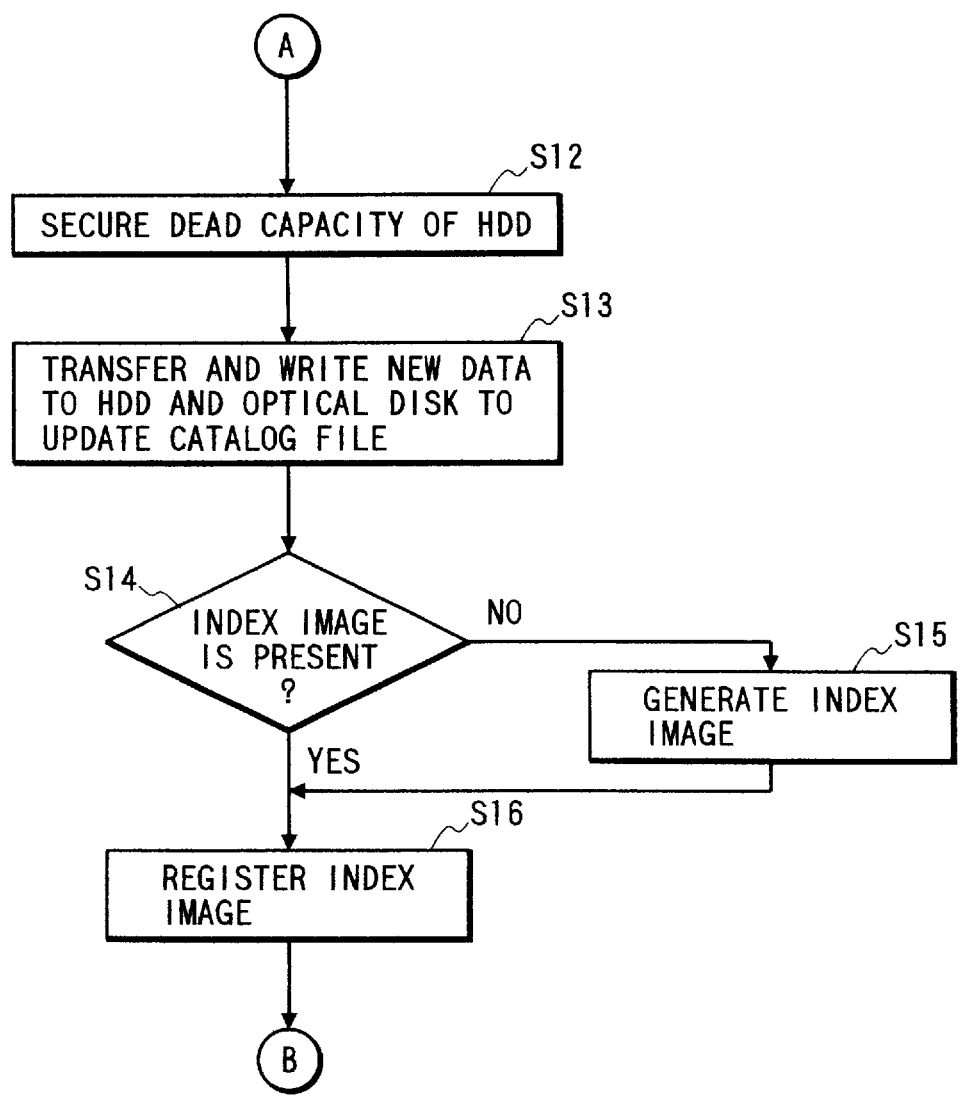

FIGS. 5A and 5B show flowcharts of a process for automatically backing up new multimedia data in the multimedia data filing system 1 when the memory card 18 is connected or the digital camera is connected to the connection terminal 23.

First, an input from a user such as menu selection is monitored in an event loop (step S1). The CPU 6 checks the occurrence of the event periodically in accordance with the management program 34 (step S2), and if the event does not occur, it conducts the background process (step S3) and again enters the monitor state. In the background process of the step S3, the multimedia data transfer and maintenance works are conducted in accordance with the management program 34 without input from the user.

When the event occurs, the process exits the event loop and returns to the step S1 after the event process to be described later. Whether the event is an end command of the event management program or not is determined (step S4), and if the end command occurs, the management program is terminated (step S5).

Whether the memory card 18 and the connection terminal 23 are connected to the digital camera interface circuit 3 or not is determined (step S6), and when the connection is detected, the process proceeds to a step S8, otherwise other process is conducted (step S7) and the process returns to the event loop (step S1).

In the step S8, the catalog file retrieval/edit means 45 which is implemented by the management program 34 retrieves the backup disk ID 39 in the access information 32 contained in the attribution information 27 of the respective data from the catalog file 26 in the memory card 18 or the digital camera.

By the result of the retrieval (step S9), whether new multimedia data which is not described in the backup disk ID 39 is present or not is determined (step S11), and if it is not present but there is another memory card or digital camera connected, the process returns to the step S8 and repeats the above process (S17). If it is present, the multimedia data reproduction/transfer means 48 secures a vacant area of the HDD 4 by using multimedia data control means 55 (step S12) and transfers the multimedia data to the HDD 4 and the optical disk 19 from the digital camera interface circuit 3 through the data bus 2 (step S13). The catalog file 26 is updated.

Whether the input multimedia data has a reduced still image representing a file as the index image or not is determined (step S14), and if it does not have the index image, the index image edit/preparation means 47 implemented by the management program 34 transfers the multimedia data to the DSP 11, prepares the index image (step S15) stores it in the HDD 4 and registers it in the catalog file 26 (step S16).

After the retrieval in the step S9, the index images including the newly inputted data are displayed in list (step S10) and the process returns to the event loop. If the multimedia data is the motion picture, the index image in the step S15 is obtained by interpolating a top frame by an interpolation circuit, not shown, to produce a reduced image. If the multimedia data is the image, the index image is the reduced image obtained by the same interpolation process as that for the motion picture. If the multimedia data is the sound data, the index image may be an ionized file path name to be described later. In order to identify the type of the index image, a color of the edge of the index image may be changed by the type of the multimedia data or identification characters such as M (motion pictures), St (still image) and So (sound) may be added to the index.

Figure 6:
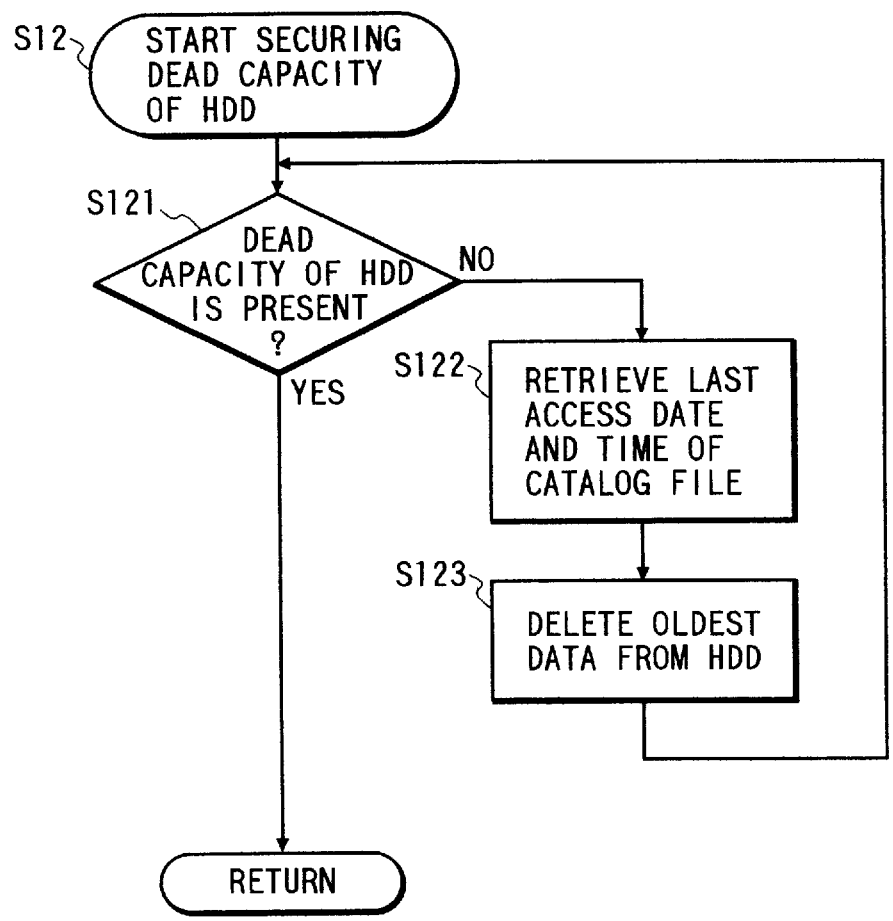
FIG. 6 shows a flowchart of a precess for securing an empty area of the HDD 4 in a step S12 of FIG. 5.

FIG. 6 shows a flowchart of a process for securing the empty area in the HDD 4. First, whether an empty area is present in the HDD 4 or not is determined (step S121), and the main data such as motion picture, still image and sound of the multimedia data are stored in the optical disk 19 and also stored in a predetermined storage area of the HDD 4. If the main data beyond the capacity is transferred from the digital camera I/O interface 3 or the optical disk 19, the empty area is not available and the catalog file retrieval/edit means 45 retrieves the last access date and time 41 in the access information 32 of the respective data from the catalog file 26 in the HDD 4 (step S122).

From the result of the retrieval, the multimedia data control means 55 sequentially deletes the main data stored in the HDD 4 staring from the least recently accessed data until a sufficient empty area to store the newly transferred data is secured (step S123).

After the completion of the process, the latest main data is stored in the empty area in the step S13 of FIG. 5B. Simultaneously, the associated information is added to the catalog file 26 in the HDD 4 and the catalog file retrieval/edit means 45 updates the file path names 38, the backup disk ID and file path names 39 and the last access dates and times 41 of both the memory card 18 and the multimedia data filing system 1.

Figure 7:
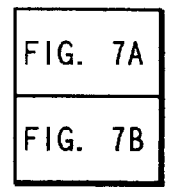
FIG. 7 is comprised of FIGS. 7A and 7B showing flow-charts of a process for displaying or reproducing multimedia data by selecting an index image by a user.
Figure 7A:
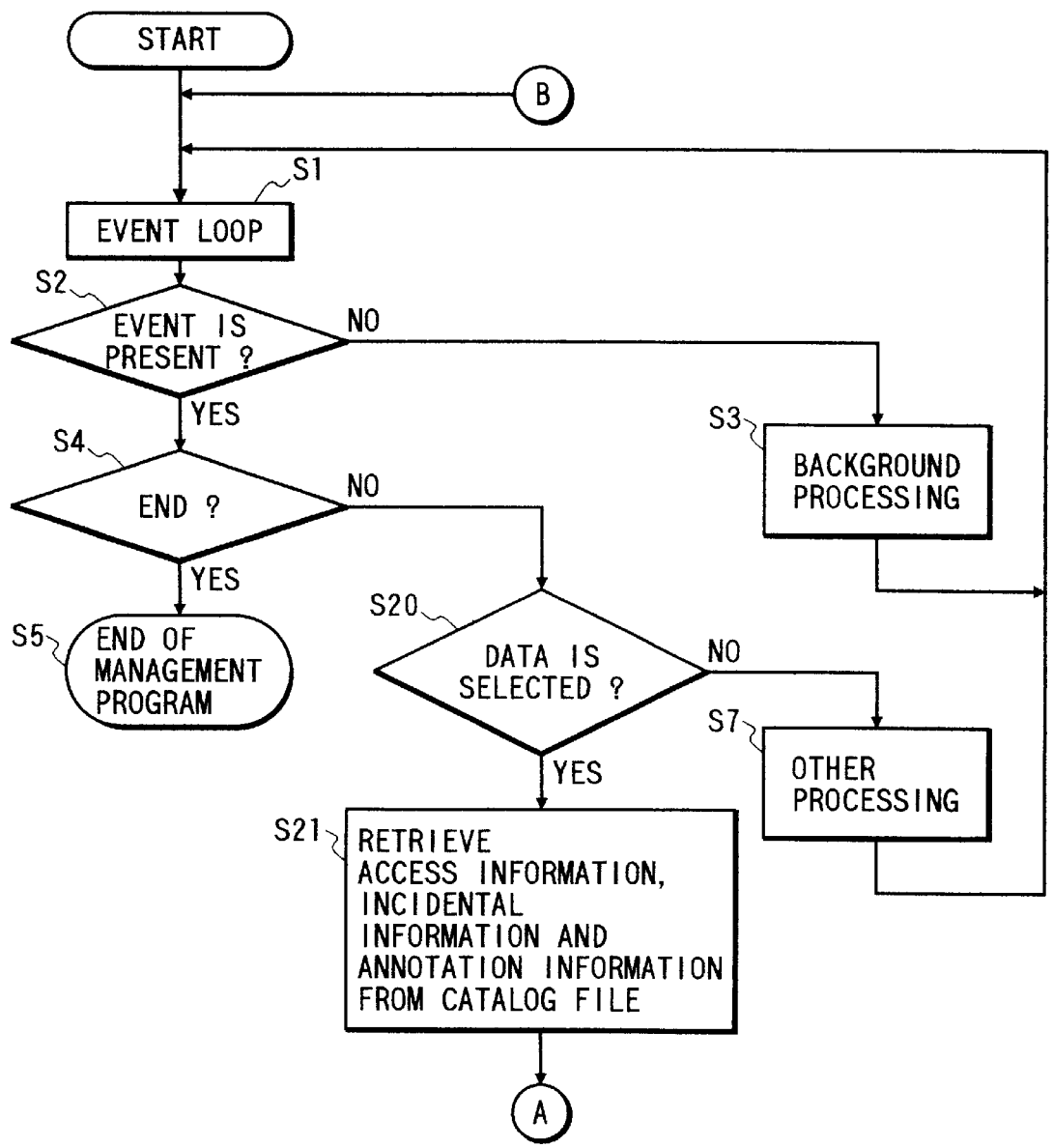
Figure 7B:
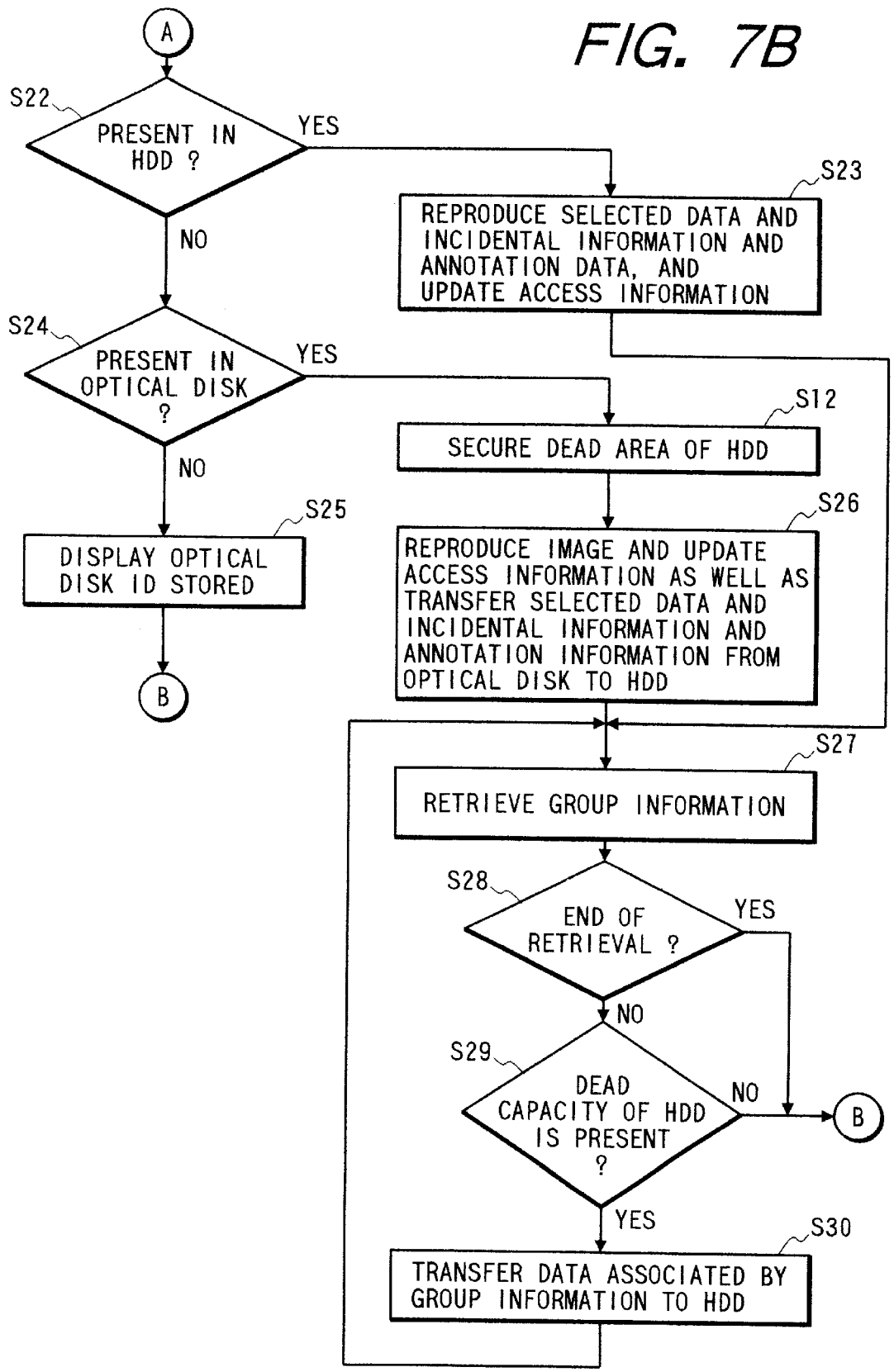

FIGS. 7A and 7B show flowcharts of a process for displaying or reproducing the multimedia data by selecting the index image by the user. The like steps to those of FIGS. 5A and 5B are designated by the like numerals and the explanation thereof is omitted.

The index images are displayed in list by the personal computer 21 connected to the multimedia data filing system 1 by the index image display/designation means 46 implemented by the management program 34.

First, when the user selects a desired image from the displayed index images by a mouse or a keyboard of the personal computer 21 (step S20), the catalog file retrieval/edit means 45 retrieves the associated information 29, the annotation information 30 and the access information 32 contained in the attribute information 27 of the multimedia data corresponding to the index image from the catalog file 26 (step S21).

From the result of the retrieval of the file path name 38 and the backup disk ID 39 in the access information 32, whether the main data is stored in the HDD 4 or not is determined (step S22), and if the main data is included in the HDD 4, it is reproduced from the HDD 4 and the last access date and time 41 is updated (step S23).

If the main data is not stored in the HDD 4, whether it is stored in the optical disk 19 connected to the optical disk drive or not is determined (step S24), and if it is stored in the optical disk 19, the multimedia data reproduction/transfer means 48 secures the empty area in the HDD 4 (step S12), reproduces the desired multimedia data from the optical disk 19, transfers it to the HDD 4 and reproduces it simultaneously or after the transfer (step S26).

After the reproduction, the file path name 38 and the last access date and time 41 of the catalog file 26 are updated. For the motion picture data and the sound data, the reproduction range is determined by the reproduction frame range 42 and the reproduction time range 44 in the access information 32, and it is normally the entire designated main data.

On the other hand, if the main data is not stored in the HDD 4 in the step S24 and the optical disk 19 which stores the data is not connected to the optical disk drive 5, the backup disk ID 39 in which the data is stored is displayed (step S25). Thus, the operator can identify the disk ID in which the main data corresponding to the selected index image is stored.

By the retrieval of the associated information 29 and the annotation information 30 in the step S21, if the multimedia data related to the selected image is stored in the HDD 4, the multimedia data reproduction/transfer means 48 transfers the related main data to the HDD 4 and reproduces it simultaneously with the selected multimedia data (step S23).

The designated data is reproduced in steps S23 and S26, and then the catalog file retrieval/edit means 45 retrieves the group information 28 contained in the attribute information 27 of the reproduced data from the catalog file 26 (step S27). After the completion of the retrieval (step S28), if the multimedia data associated by the group information 28 is present, the multimedia data reproduction/transfer means 48 determines whether the empty area of the HDD 4 is present or not (step S29), and if the empty area is present, it transfers the associated main data to the HDD 4 (step S30).

If the empty area is not present in the HDD 4, the process returns to the step S1.

When the data associated by the group information is reproduced net time and if a sufficient empty area is present in the HDD 4, the data may be immediately reproduced from the HDD 4 even if the optical disk storing the data is not connected to the optical disk drive 5 of the multimedia data filing system 1. Thus, the optical disk need not be exchanged in the reproduction. When the optical disk is connected, the waiting time to the reproduction may be significantly reduced.

Second Embodiment

Figures 8, 8A:
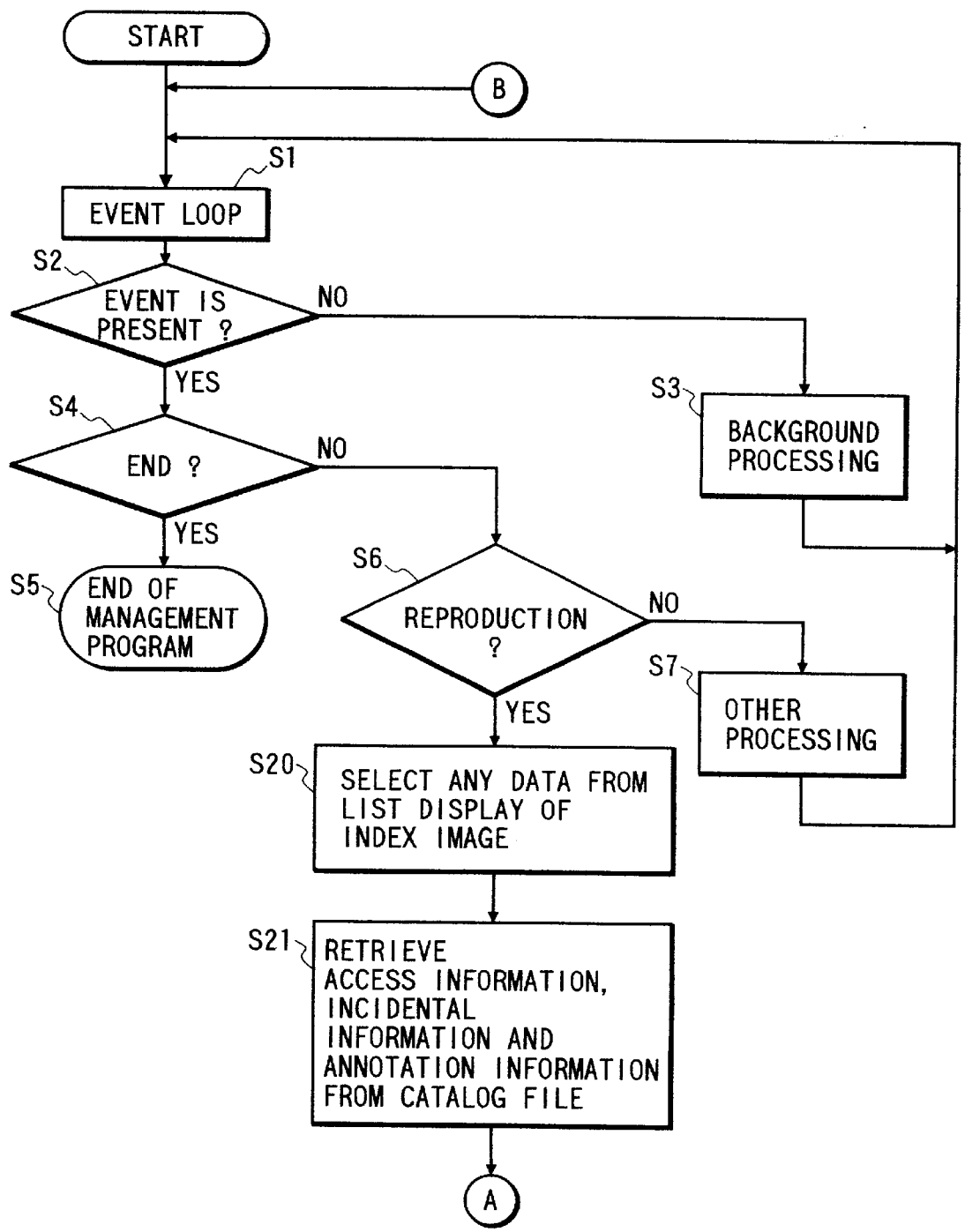
FIG. 8 is comprised of FIGS. 8A and 8B showing flow-charts of a process for displaying or reproducing multimedia data by selecting the index image by the user in a second embodiment.
Figure 8B:
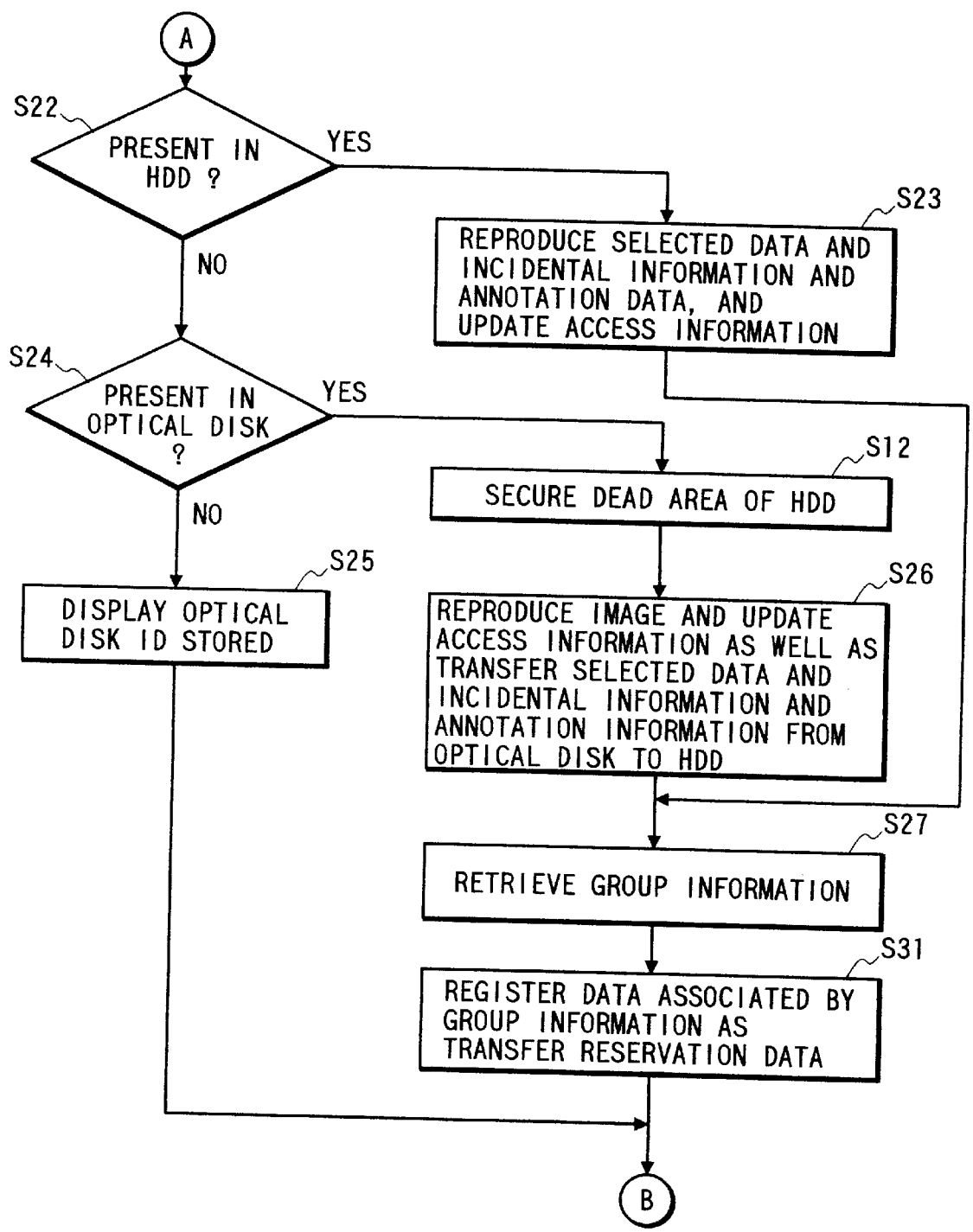

FIGS. 8A and 8B show flowcharts of a second embodiment showing a process for displaying or reproducing the multimedia data by selecting an index image by the user.

A difference from the flowchart of FIGS. 7A and 7B resides in that after the reproduction of the designated data, the catalog file retrieval/edit means 45 retrieves the group information from the catalog file 26 in the step S27, and if the multimedia data associated by the group information 28 is present, the related data is registered as transfer reservation data in a step S31 and the process returns to the event loop.

Figure 9:
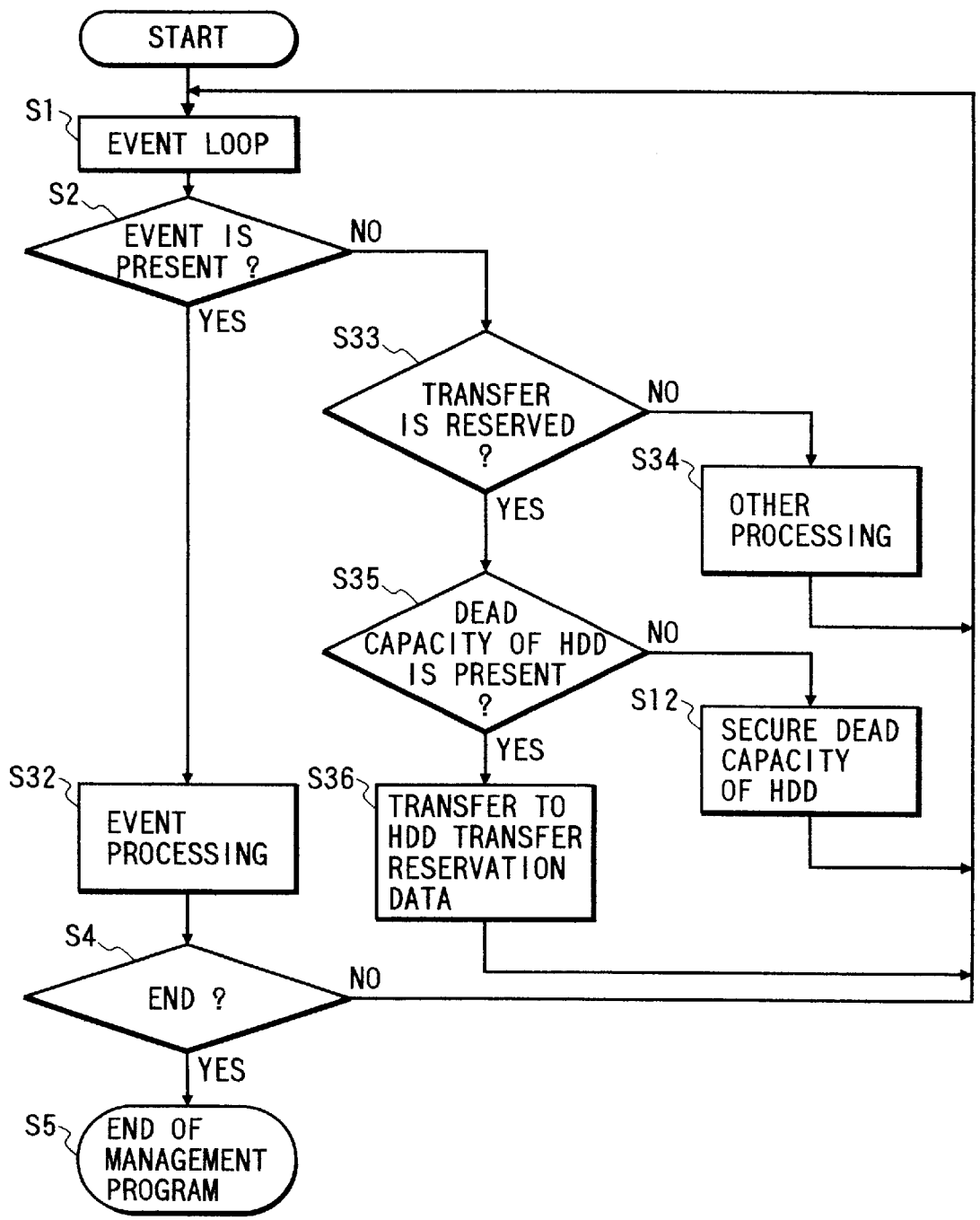
FIG. 9 shows a flowchart of a process of a transfer reserve data.

FIG. 9 shows a flowchart of a process of the transfer reservation data. In this process, if the event does not occur, the transfer reservation data is transferred to the HDD 4 in a background process.

The occurrence of the event is periodically checked in accordance with the management program 34 (steps S1 and S2), and when the event occurs, the event process is conducted (step S32), whether an end command of the management program is issued or not is determined (step S4), and if the end command is issued, the management program is terminated (step S5), otherwise the process returns to the event step Si.

On the other hand, if the event does not occur in the step S2, the process proceeds to a step S33 to determine whether the transfer reservation data is present or not. If the transfer reservation data is not present, other process is conducted (step S34) and the process returns to the event loop step S1. If the transfer reservation data is present, the process proceeds to step S35 to determine whether a sufficient empty area to transfer the data is present in the HDD 4 or not, and if the empty area is not present, the process proceeds to the step S12 to secure the empty area by the same process as that of FIG. 6. If the empty area is present, the process proceeds to a step S36 to transfer the transfer reservation data to the HDD 4.

In the background process, the process may return to the event loop after a predetermined time period even if the data transfer or the securing of the empty area of the HDD 4 has not been fully completed. Thus, when the event occurs during the background process, the event process may be conducted without waiting for longer than the predetermined time period.

In accordance with the display and reproduction process of the second embodiment shown in FIGS. 8A, 8B and 9, the transfer of the data associated by the group information to the HDD 4 is conducted in the background process so that other process may be conducted immediately after the reproduction of the designated data even if the related data is of large volume and take a long time for the transfer.

The display and reproduction of the main data are conducted by controlling the DSP circuit 11 by the multimedia data reproduction transfer means 48 implemented by the management program 34. For the output such as the display/reproduction, the main data is sent to the personal computer interface 9, the video control circuit 10, the printer control circuit 14 and the sound interface 15 by the multimedia data reproduction/transfer means 48 through the data bus 2 and outputted to the personal computer 21, the display 20, the printer 22 and the speaker 17, respectively.

The DSP circuit 11 also conducts the processing of the compression, decompression, enlargement, reduction, aspect ratio conversion and format conversion of the multimedia data by the multimedia data reproduction/transfer means 48 implemented by the management program 34. The input analog video signal from the analog interface 13 is converted to the digital signal by the A/D converter 12, compressed by the DSP circuit 11 by the Motion-JPEG or MPEG system and transferred to the HDD 4 and the optical disk 19.

Figure 10:
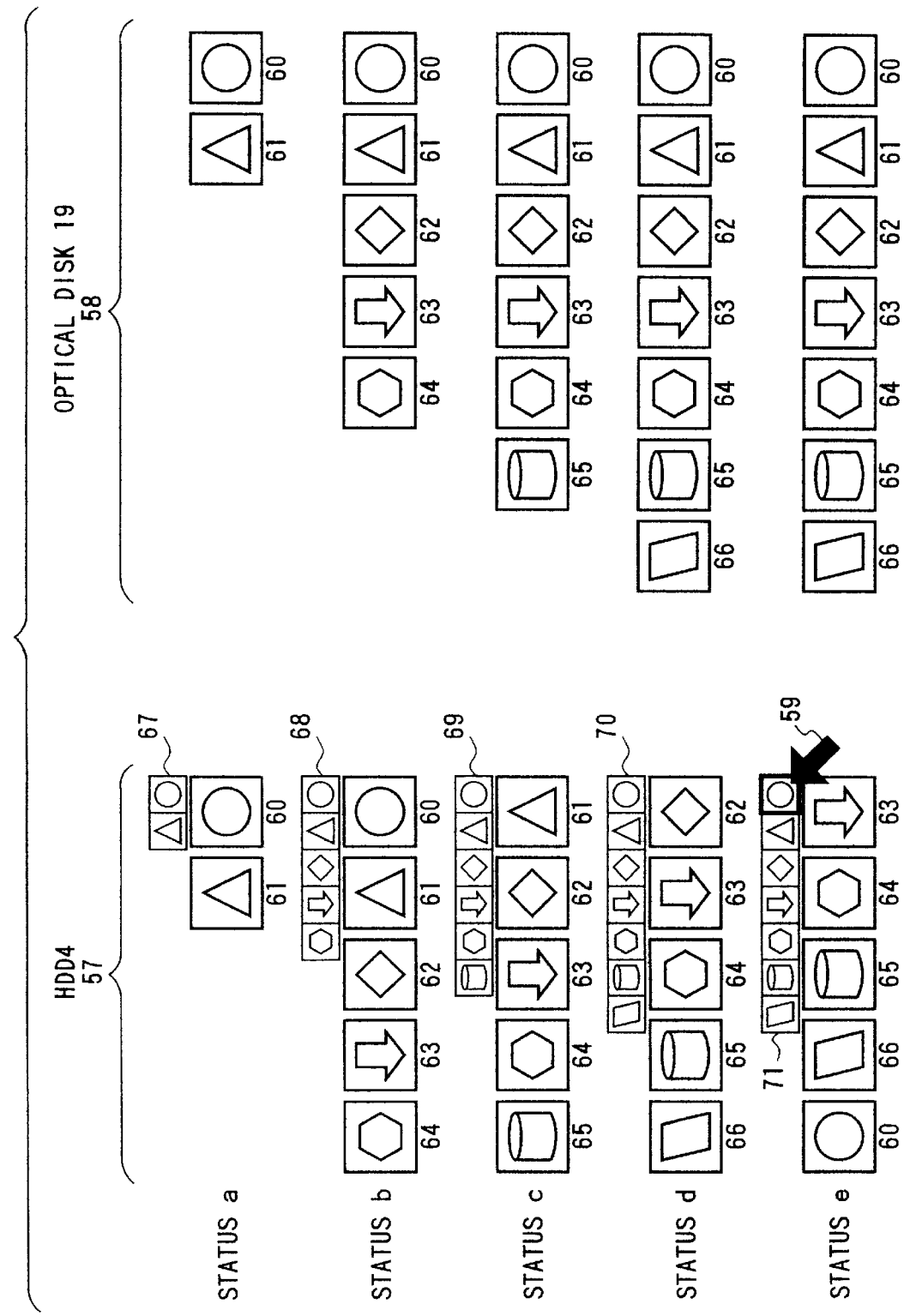
FIG. 10 illustrates movement of main data and index image data in the HDD 4 and the optical disk 19 when the multimedia data is inputted and selected in the multimedia filing system 1.

FIG. 10 illustrates the movement of the main data the index image data in the HDD 4 and the optical disk 19 when the multimedia data is inputted and selected in the multimedia data filing system 1. In FIG. 10, status a, b, c, d and e indicate that the multimedia data filing system 1 is operated in the order of a, b, c, d and e. Numeral 57 denotes main data and index image data stored in the HDD 4 in the status a to e and numeral 58 denotes the main data stored in the optical disk 19 in the status a to e. Numeral 59 denotes a cursor by the input means such as a mouse or a keyboard of the personal computer. Numerals 60 to 66 denote multimedia main data and numerals 67 to 71 denote index image list displays in the status a to e.

In the status a, the image data 60 and 61 are inputted to the multimedia data filing system 1 and backed up in the HDD 4 and the optical disk 19.

In the status b, the image data 62, 63 and 64 are inputted and the area of the HDD 4 for storing the main data is almost occupied.

In the status c, the image data 65 is inputted and the area of the HDD 4 for storing the main data is exceeded so that the main data of the least recently inputted image data 60 is deleted from the HDD 4. The index image remains stored in the HDD 4.

In the status d, the image data 66 is inputted and the least recently inputted image data 61 in the HDD 4 is deleted as it is in the status c.

In the status e, the index image indicating the image data 60 is selected from the index images 71 displayed in list by the cursor 59 of the input means of the personal computer 21 and the multimedia data filing system 1 deletes the least recently inputted image data 62 in the HDD 4, searches the optical disk 19 and transfers and stores the image data to the HDD 4.

Figure 11:
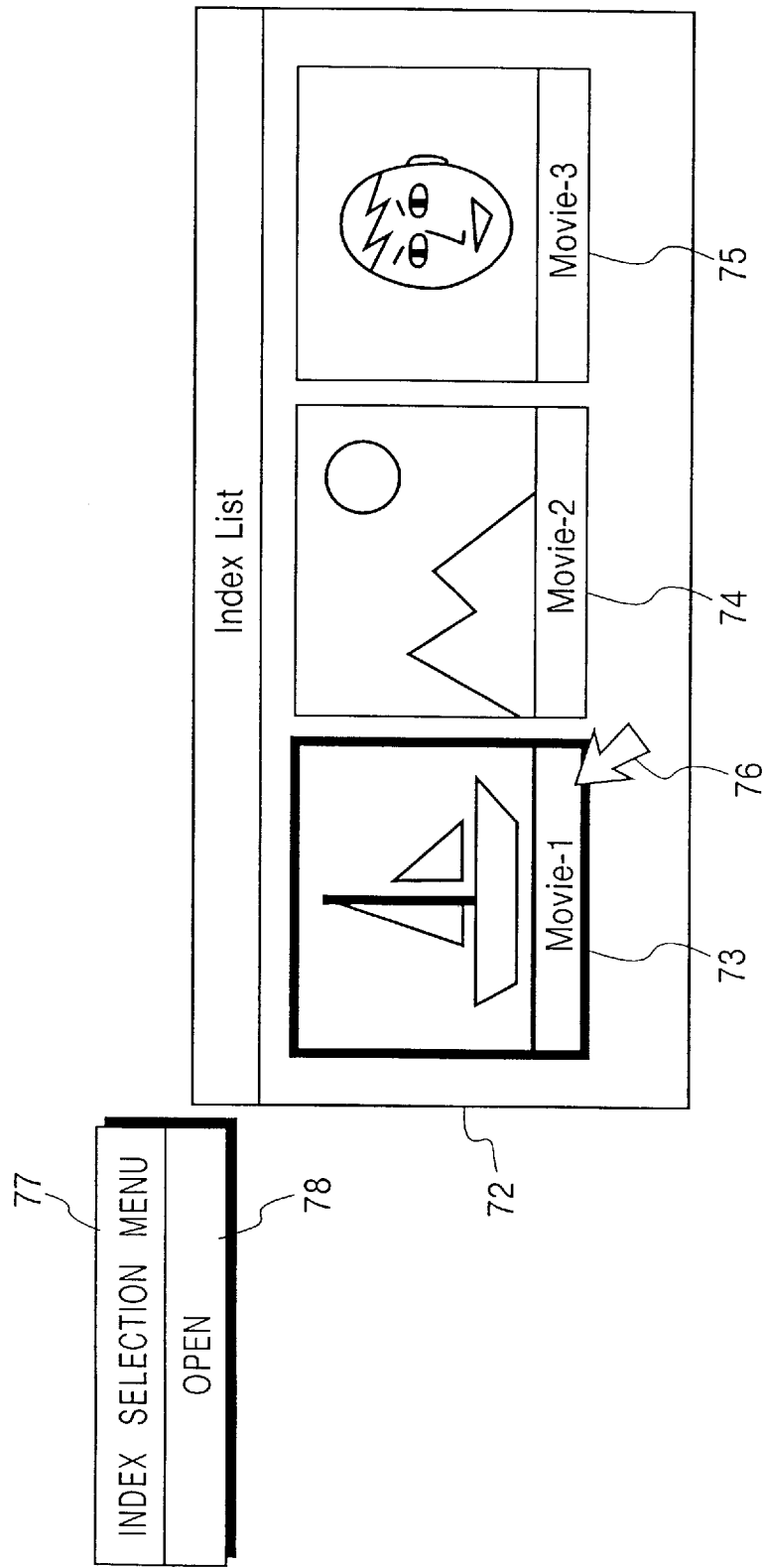
FIG. 11 illustrates an image realized by a management program 34 when a motion picture image is reproduced on a personal computer 21 connected to the multimedia data filing system 1.

FIG. 11 illustrates an image implemented by the management program 34 when the motion picture image is reproduced on the personal computer 21 connected to the multimedia data filing system 1. In FIG. 11, the index image display/designation means 46 is stated. Numeral 72 denotes a window for displaying the index images in list and numerals 73, 74 and 75 denote index images of the motion picture data Movie-1, Movie-2 and Movie-3, respectively.

Numeral 76 denotes a cursor of the input means such as the mouse of the personal computer 21. When a desired index image is designated by the cursor 76, the display frame of the designated index image is thickened for identification. When "open" 78 is selected from an index selection menu 77, the multimedia data reproduction/transfer means 48 is started.

Figure 12:
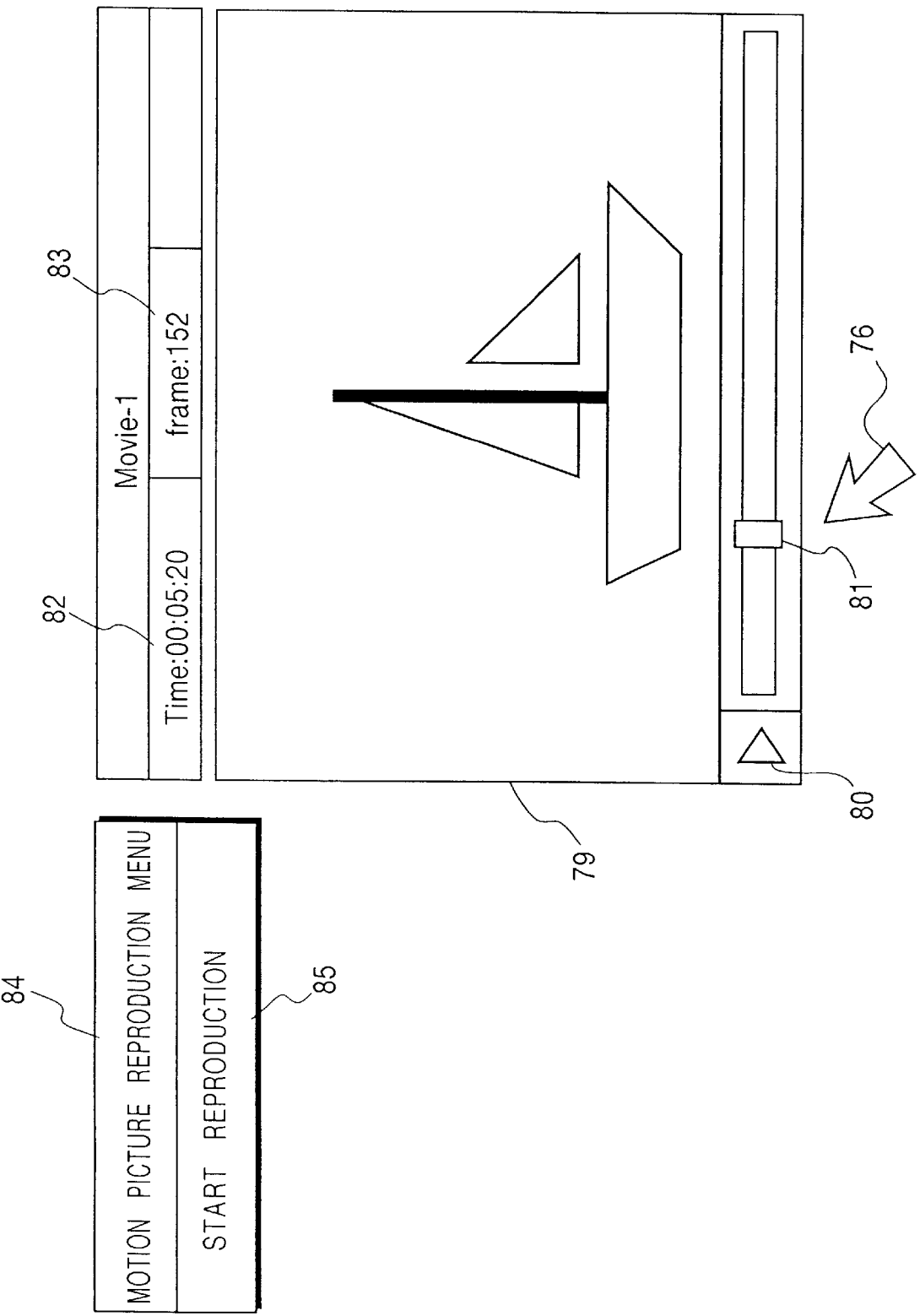
FIG. 12 illustrates a status of selection and display of Movie-1.

FIG. 12 illustrates a status in which the Movie-1 is selected and displayed. In FIG. 12, numeral 79 denotes an image display area of the Movie-1, numeral 80 denotes a reproduce/stop button, numeral 81 denotes a slider knob, numeral 82 denote a reproduction time display, and numeral 83 denotes a reproduction frame display. The Movie-1 is reproduced by pointing the "start reproduction" 85 of the motion picture reproduction menu 84 or the reproduction/stop button 80 by the cursor 76 by moving the slider knob 81 by the cursor 76, indexing of any scene may be conducted.

Figure 13:
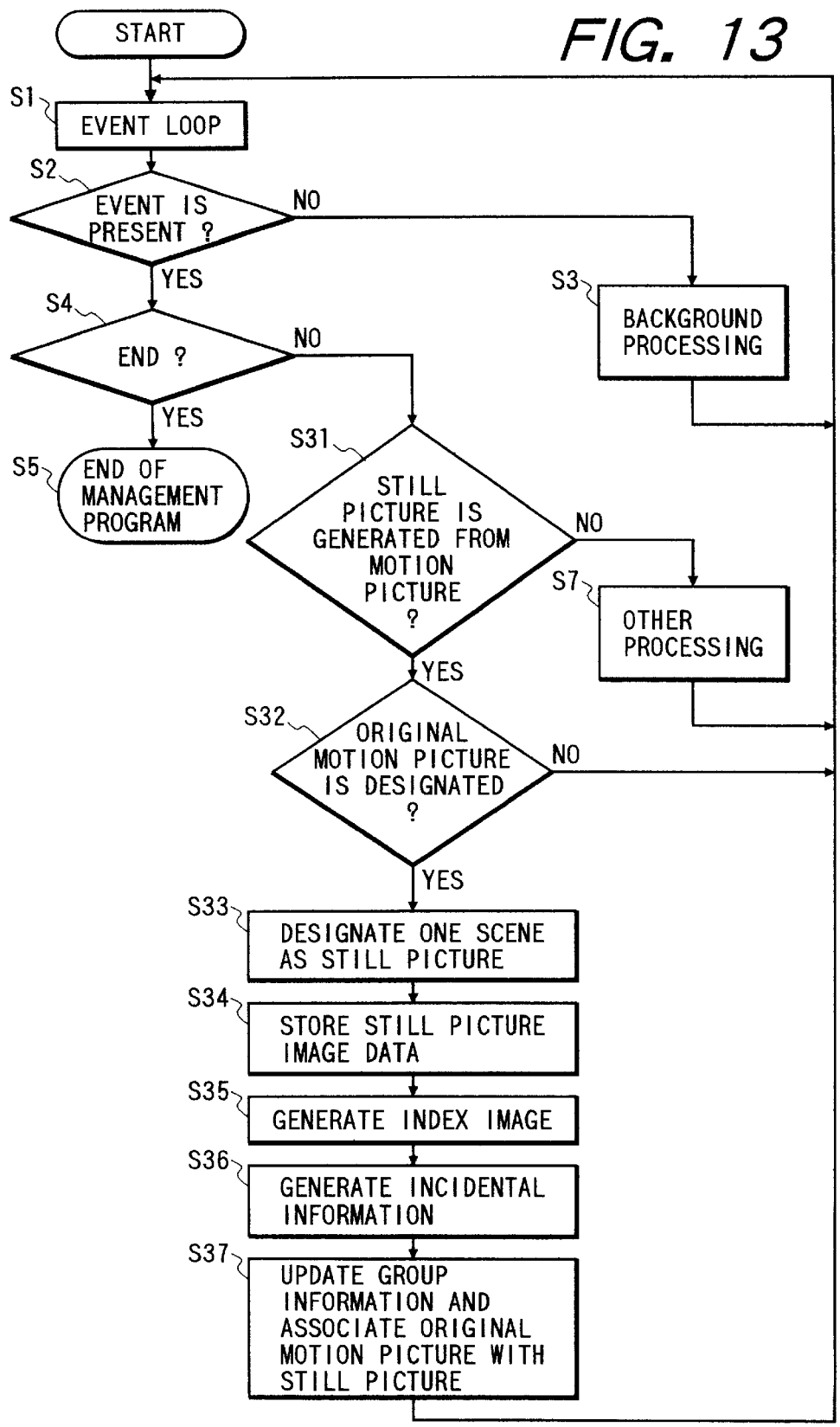
FIG. 13 shows a flowchart of a process for extracting any one frame from the motion picture data as a still image, associating images to each other by group information 28 in a catalog file 26, and transferring it to the HDD 4 so that when one is selected the other may also reproduce it immediately.

FIG. 13 shows a flowchart of a process for extracting any one of frame from the motion picture as a still image, associating images to each other by the group information 28 in the catalog file 26 and transferring it to the HDD 4 so that when one is selected the other can also immediately reproduce. The like steps to those shown in FIGS. 7A and 7B are designated by the like step numbers and the explanation thereof is omitted.

When an event to prepare a still image from the motion picture occurs (step S31), whether the source motion picture data from which the still image is to be extracted is selected or not is determined (step S32), and when one scene to be extracted from the source motion picture data as the still image is designated (step S33), the designated still image is stored (step S34), the index image is prepared (step S35), and the image pickup data and time are determined based on the frame number and the reproduction time of the source motion picture data from which the still image is extracted, the associated information 29 together with other image pickup information are automatically prepared and they are added to the attribute information 27 of the still image data of the catalog file 26 (step S36). The access information 32 and the group information 28 indicating the association with the source motion picture image are registered (step S37).

FIGS. 14A and 14B illustrate images implemented by the management program 34 when one scene is extracted from the motion picture image as the still image. By pointing the reproduce/stop button 80 or the slider knob 81 by the cursor 76 or entering a numeric value to the reproduction time display 82 or the reproduction frame display 83 from the keyboard of the personal computer 21 to display a desired scene from the motion picture data and by selecting the "still image" 87 of the still image preparation menu 86, the displayed image is registered as the still image FIG. 14B illustrates a second display in list. By setting in a setting column 87-C displayed by clicking a list mode of 87-A by the cursor 76 and designating "OK", the list image is displayed. In the list mode, the still image may be selected while watching a plurality of images. By clocking the image and designating a watch mode 87-B, the display is switched to the image A, and after the check of the detail, the still image may be designated.

Figure 15A:
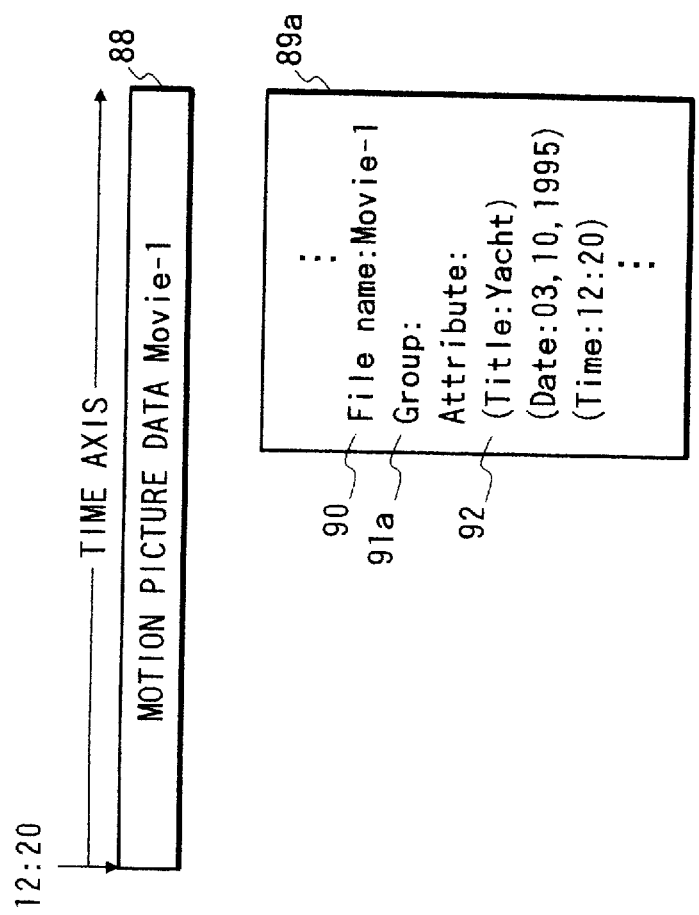

FIGS. 15A and 15B illustrate the data structure and the updating of the catalog file when the still image is extracted from the motion picture data. FIG. 15A shows the status when the still image is not yet extracted from the motion picture data 88. Numeral 89a denotes an abstract of the description on the motion picture data 88 of the catalog file 26, and the file path name 90, the group information 91a and the associated information 92 are shown. The group information 91a has no description and indicates no association as the group with other multimedia data. The associated information 92 includes the description of the title of the motion picture data 88 and the start date and time of the image pickup.

FIG. 15B shows a status when the still image 93 is extracted from the top of the motion picture data 88. The content of the catalog file 26 is updated as shown by 89b. The group information 91b for the motion picture data 88 is updated and the file path name of the extracted still image file is described. For the new still image file 93, the file path name 94, the group information 95 and the associated information 96 are described. Since the file path name and the frame of the source motion picture data from which the still image is extracted are described in the group information 95, the main data of the extracted still image may be stored separately from the source motion picture data, or the main data is not stored and in the reproduction the catalog file is searched to develop and reproduce the source motion picture data.

For the associated information, the reproduction time to the extracted still image is calculated based on the title, the image pickup date and time and the image pickup start time of the source motion picture data from which the still image is extracted, and the image pickup date and time of the extracted still image are automatically calculated and described as shown in the step S36 of FIG. 13. In FIG. 13, the image pickup start time is 12:20 and the data of five minutes later is extracted as the still image. Thus, 12:25 is described in the associated information. For the image pickup condition other than the image pickup date and time, the data of the source motion picture data is used as it is.

As shown in FIGS. 7A through 9, when the multimedia data is reproduced, the group information in the catalog file 26 is retrieved (step S27) and the associated data is transferred to the HDD 4 (step S30). Thus, when one of the motion picture data and the still image extracted from the motion picture data is reproduced, the other is transferred to the HDD 4 so that when the other is to be reproduced, it may be immediately reproduced.

A multimedia data edit operation to delete at least a portion of the time serial data such as the motion picture data from the reproduction range by the management program 34 to reproduce only necessary portion or extract a portion of the source data and reproduce only the extracted portion is now explained.

FIGS. 16A, 16B, 17, 18A to 18C and 19A to 19C illustrate frame structures of the motion picture data compressed in a digital form and status to convert a compression system of the frame of the boundary of the extracted frame range when the portion of the compressed motion picture data is extracted.

In the motion picture data, in order to enhance the data compression efficiency, a compression system having a frame correlation in which the time redundancy is reduced by correlating the frame to be compressed and the front or back frame in time is frequently used (MPEG, H.261, etc.). When a portion of the motion picture image compressed by this compression system is extracted and the extracted portion and other portion are to be independently reproduced, it is necessary to convert the compression form of the frames before and after the extracted portion.

Figures 16A, 16B:
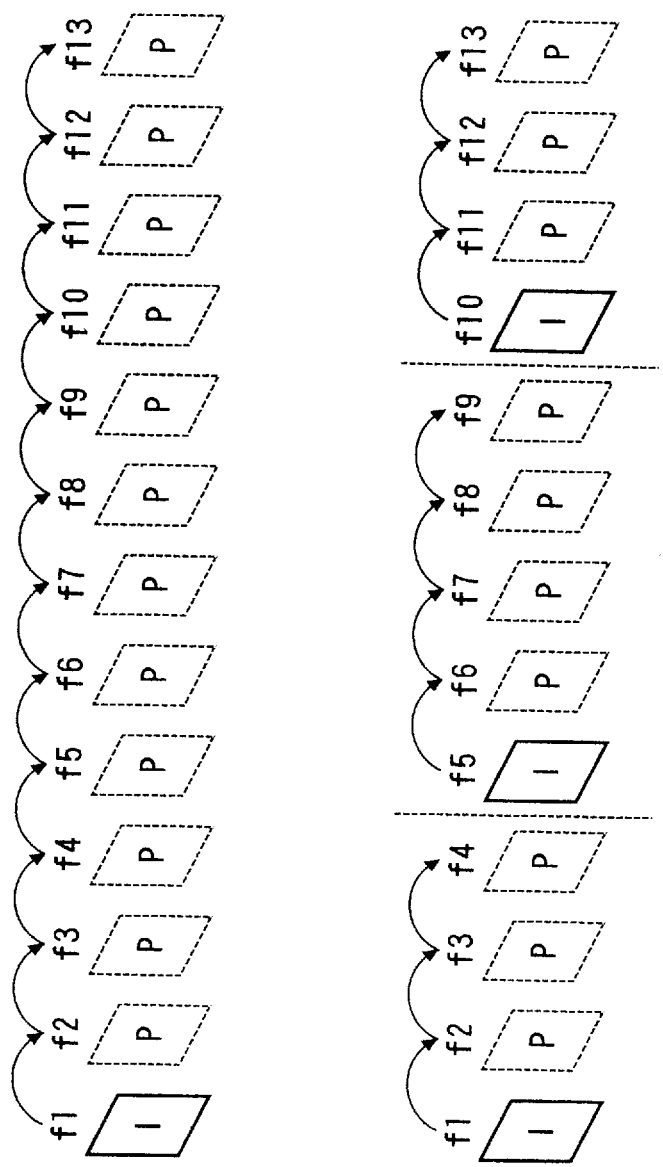
FIGS. 16A and 16B illustrate a frame structure of the motion picture image compressed in a digital form and a status to convert a compression system of a boundary of an extracted frame area when a portion of the compressed motion picture data is extracted.

In FIGS. 16A and 16B, f1 to f13 show frame images of the motion picture. A pattern shown by solid lines and a letter "I" like f1 of FIGS. 16A and 16B is referred to as an intra-coded image (1 picture) which can reconstruct the image by its own information when the compressed image is to be decoded, and a pattern shown by broken lines and a letter "P" like f2 is referred to as a forward prediction coded picture (P picture) which is located forward in time in the input as the prediction picture. It uses the previously decoded I picture or P picture and, in general, it is of higher efficiency than the I picture. An arrow indicates a prediction picture referenced by the respective P pictures.

FIG. 16A shows the source motion picture data before the extraction range is designated. Only f1 is the I picture and f2 to f13 are all P pictures, and it is compressed and developed with reference to the image which is one frame before itself. Accordingly, in the reproduction, only the sequential reproduction from f1 is permitted and the random access such as the reproduction with the skip of the intermediate frames and the reproduction from an intermediate frame is not permitted.

FIG. 16B shows the motion picture data after the edition of f5 to f9 as the extraction range. Comparing it with FIG. 16A, f5 and f10 are converted to the I pictures. Accordingly, it is permitted to reproduce f1 to f4, not reproduce f5 to f9 and reproduce f10 and subsequent frames.

Figure 17:
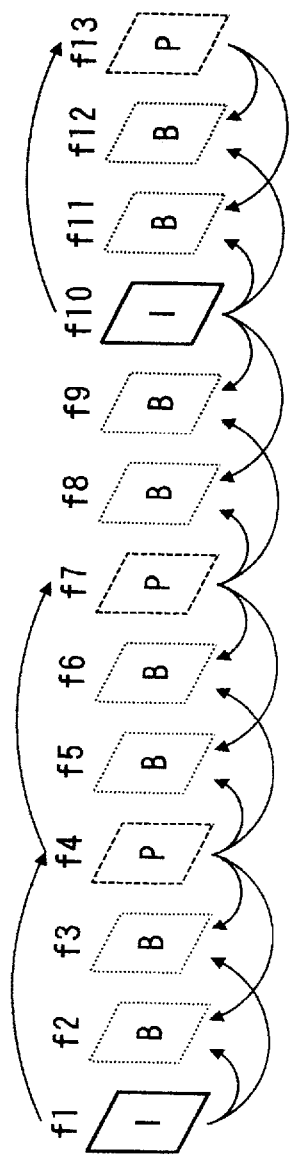
FIG. 17 illustrates a frame structure of the motion picture data compressed in the digital form and a status to convert the compassion system of a frame of a boundary of the extracted frame area when a portion of the compressed motion picture data is extracted.

FIG. 17 illustrates motion picture data compressed by using the I picture, the P picture and the B picture described above. In FIG. 17, bidirectional prediction coded image (B picture) which is represented by broken lines and a letter "B" like f2 is included in addition to the I picture and the P picture. The B picture uses the decoded I picture or P picture located forward in time and the decoded I picture or P picture located backward in time as the prediction images. The coding of the motion picture image using the I picture, the P picture and the B picture is used in the MPEG system.

The I pictures are f1 and f10, and f4, f7 and f13 are P pictures which use f1, f4 and f7 as the prediction pictures, respectively, and f2, f3, f5, f6, f8, f9, f11 and f12 are B pictures which use the forward and backward I pictures or P pictures as the prediction pictures. An arrow indicates a position of the prediction image referenced by the P picture and the B picture. An interval of the I pictures and the P pictures may be arbitrary but the I pictures are inserted at an interval of one frame for every tenth to several tenth frames in order to meet the requirement of special reproduction of the motion picture data, particularly search, fast feed, reproducing rewind and reproduction from an intermediate frame.

Figures 18A, 18B, 18C:
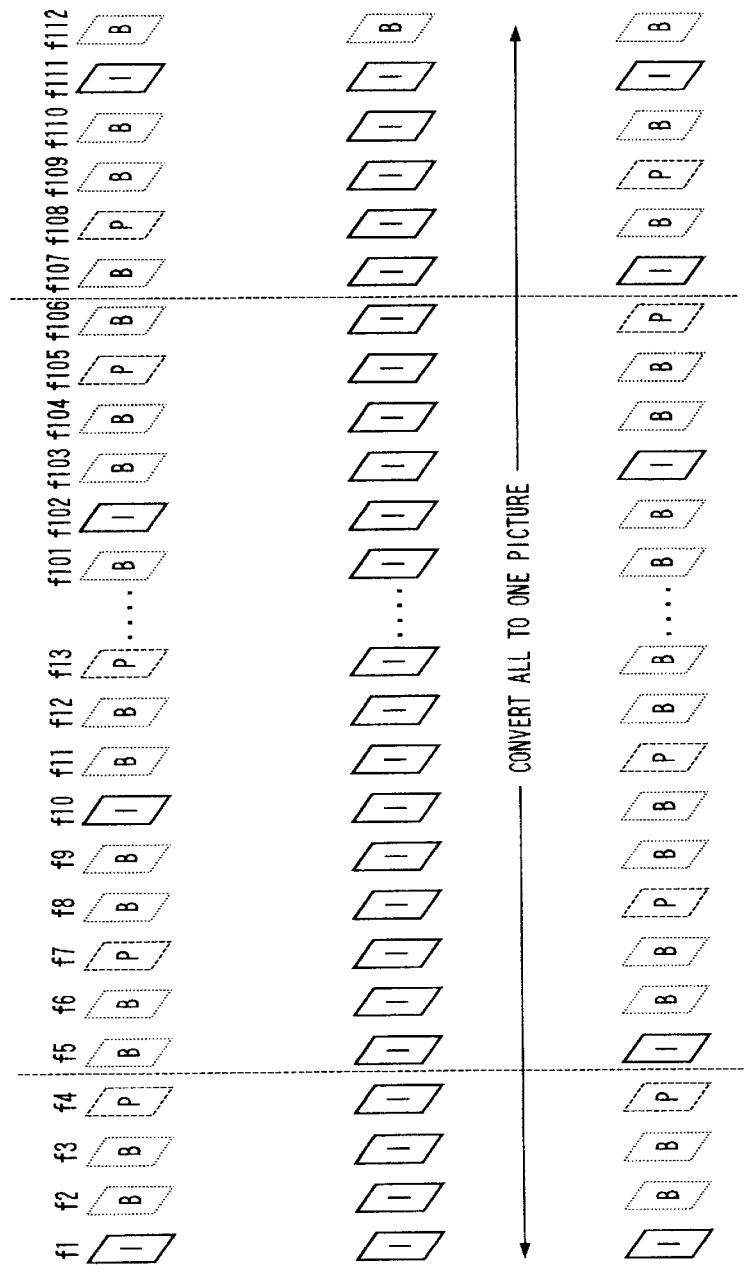
FIGS. 18A to 18C illustrate a frame structure of the motion picture data compressed in a prior art digital form and a status to convert the compression system of the frame of the boundary of the extracted frame area when a portion of the compressed motion picture data is extracted.

FIGS. 18A and 18B illustrate the conversion of the conventional compression system when a frame range of a portion of the motion picture data using the same compression system is extracted. In the prior art, in the motion picture data of FIG. 18A, when the extraction range is designated, for example, when f5 to f106 are designated as the extraction range, the I picture before the extraction start frame to the I picture after the extraction end frame are converted to the I pictures as shown in FIG. 18B, the number of frames in the extraction range is counted, and extraction range and the frames before and after thereof are reconstructed by the I pictures, the P pictures and the B pictures as shown in FIG. 18C.

Accordingly, 111 I pictures f1 to f111 must be developed and a large capacity of memory is required, a long process time is required, and in the reconstruction, 102 frames f5 to f106 must be reconstructed and complex operations are needed.

In the multimedia data filing system of the present embodiment, the above problems are overcome by the following method. FIGS. 19A to 19C illustrate the conversion of the compression system when the frame range of a portion of the motion picture data is extracted.

In the motion picture data of FIG. 19A, when the extraction range is designated, for example, when f5 to f106 are designated as the extraction range, the I picture before the frame to the I picture after the frame at the extraction start frame f5 and the end frame f106, respectively, are converted to the I pictures as shown in FIG. 19B. Then, the I pictures, the P pictures and the B pictures are reconstructed in four portions, that is, the first I picture of the converted I pictures to the front of the extraction start frame (f1–f4), the extraction start frame to the I picture after the extraction frame (f5–f11), I picture before the extraction end frame to the extraction end frame (f102–f106) and the rear of the extraction end frame to the I picture after the extraction end frame (f107–f111). FIG. 19C shows an example of reconstruction.

Accordingly, in the present embodiment, the total number of frames to be temporarily converted to the I pictures is 20 for f1 to f10 and f102 and f111 and it is constant in the compressed motion picture data in which the interval of the I pictures is constant without regard to the length of the extraction range and hence the memory occupation is small and the processing speed is reduced. Further, since the reconstruction may be made in four paths, complex operations are not required.

In FIG. 19C, in the extracted range, f5 is the I picture, f7 and f9 are P pictures which use f5 and f7 as the prediction images, and f6 and f8 are B pictures which use f5 and f7, and f7 and f9, respectively, as the prediction imaged. Accordingly, it is permitted to reproduce f1 to f4, not reproduce f5 to f106 and reproduce f107 and subsequent frames. Alternatively, it is permitted to reproduce only f5 to f9.

Figure 20B:
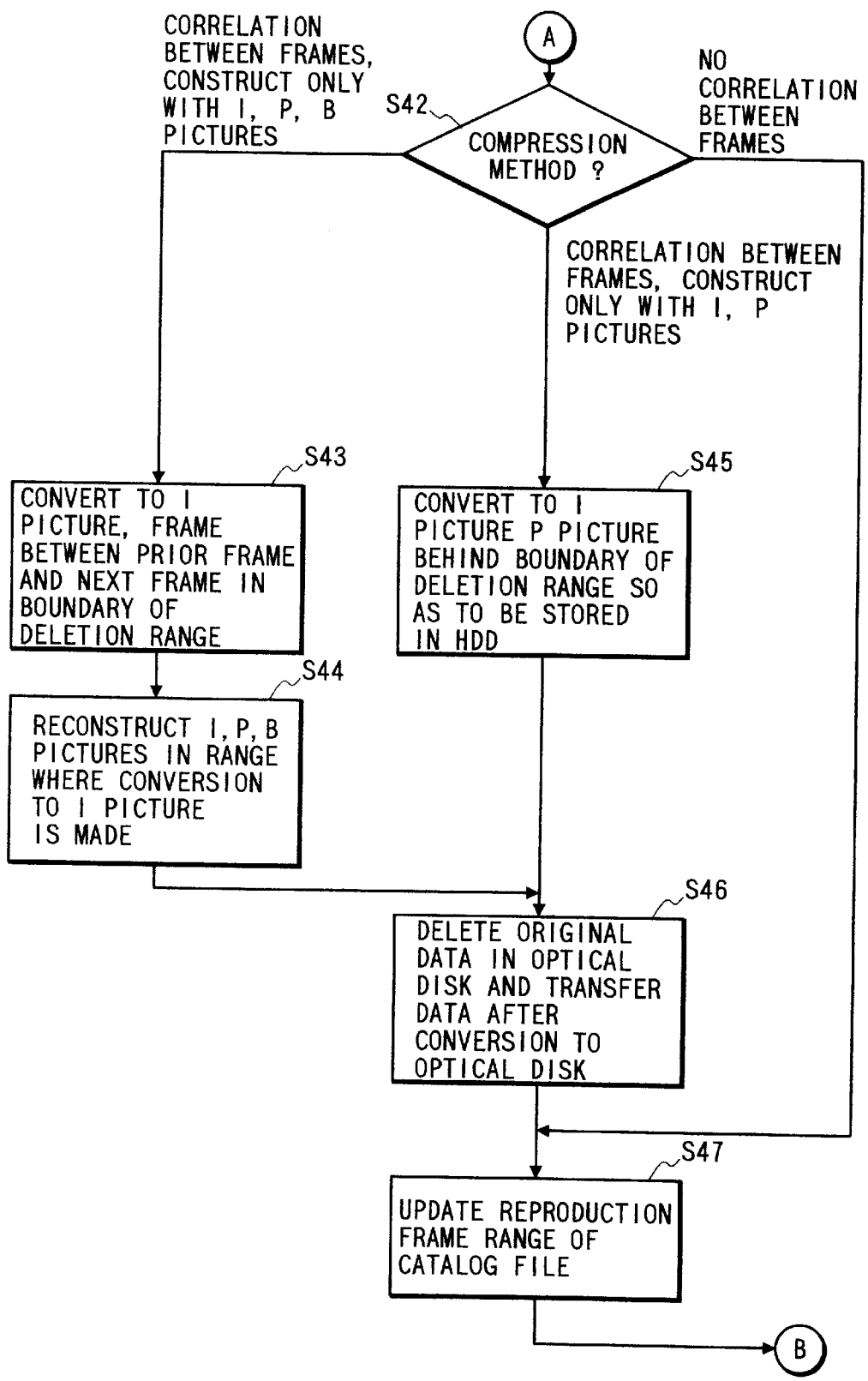
FIG. 20 is comprised of FIGS. 20A and 20B showing flowcharts of an edit work for deleting at least a portion of the motion picture data or extracting a portion of the motion picture data and reproducing only the extracted portion.

FIGS. 20A and 20B show flowcharts of an edit operation to delete at least a portion of the motion picture data or extract a portion thereof and reproduce the extracted portion.

When the event occurred in the step S37 is the edition of the motion picture or not is determined in accordance with the management program 34 (step S37), and if it is the edition of the motion picture, the process proceeds to a step S38, and if it is not the edition of the motion picture, the process proceeds to the step S7 to conduct other process, and then the process returns to the event loop.

In the step S38, whether the motion picture to be edited is designated or not is determined, and if it is designated, the process proceeds to a step S39, and if it is not designated, the process returns to the event loop.

In the step S39, whether the designated range is to be extracted from the source motion picture and only that range is to be reproduced or the designated range is to be removed from the reproduction range and the reproduction is made while skipping the designated range is determined, and if it is the former, the process proceeds to a step S40, and if it is the latter, the process proceeds to a step S41. After the extraction range or the remove range is designated, the compression system 43 in the access information 32 of the motion picture data to be edited is searched (step S42).

From the result of search, it is classified to one of the three systems, that is, the compression system comprises the I pictures, the P pictures and the B pictures as shown in FIG. 17, comprises the I pictures and the P pictures as shown in FIGS. 16A and 16B and the system without correlation between the frames.

When the compressed motion picture data comprises only the I pictures and the P pictures, the process proceeds to a step S45, and as explained in FIGS. 16A and 16B, the frame after the boundary of the removal range is converted to the I picture and the converted motion picture data is stored in the HDD 4. Then, the source data in the optical disk is deleted and the converted data in the HDD 4 is transferred to the optical disk 19 (step S46).

When the compressed motion picture data comprises the I pictures, the P pictures and the B pictures, the process proceeds to a step S43 and as explained in FIGS. 19A to 19C the I picture before the frame to the I picture after the frame at each of the start frame and the end frame of the removal range are temporarily converted to the I pictures, and the I pictures, the P pictures and the B pictures are reconstructed in four portions, that is, from the first converted I picture to the front of the extraction start frame, from the extraction start frame to the I picture after the extraction frame, from the I picture before the extraction end frame to the extraction end frame, and from the rear of the extraction end frame to the I picture after the extraction end frame (step S44). Then, the source data in the optical disk is deleted and the converted data in the HDD 4 is transferred to the optical disk (step S46).

When the compressed motion picture data is of the compression system having no correlation between frames, no process is applied to the source motion picture data and the process proceeds to a step S47.

After the completion of the process to the motion picture data, the process proceeds to the step S47 and the catalog file retrieval/edit means 45 implemented by the management program 34 updates the reproduction frame range 42 of the access information 32 in the catalog file 26 to reproduce while excluding the portion deleted in the step S41 if the deletion is selected in the step S39, and updates to reproduce only the range extracted in the step S40 if the extraction is selected.

FIGS. 21A and 21B illustrate displays implemented by the management program 34 when the motion picture data is edited. In FIG. 21A, the reproduction/stop button 80 and the slider knob 81 are pointed by the cursor 76 or numeric values are entered to the reproduction time display 82 or the reproduction frame display 83 to call a scene for which the deletion of the motion picture 79 to be edited is started, and then "start deletion" 98a is selected from the motion picture edition menu 97. When "start deletion" 98a is selected once more, it is changed to "complete deletion" 98b as shown in FIG. 21B and it waits for the input. Then, the last scene of the deletion range is called as shown in FIG. 21B and "complete deletion" 98b is selected from the motion picture edition menu 97.

By the above process, the image in the selected range is not produced thereafter. When "recover deletion" 100 of the motion picture edition menu 97 is selected, the image of the range deleted in the above process is reproduced. When "extraction" 99 is selected, only the designated range is reproduced.

FIGS. 22A to 22C illustrate data structures when a portion of the motion picture data is deleted, extracted or edited. As shown in FIG. 22A, the motion picture data 101 is stored in the optical disk 19 and comprises 120 frames a1 to a120.

Figure 23A:
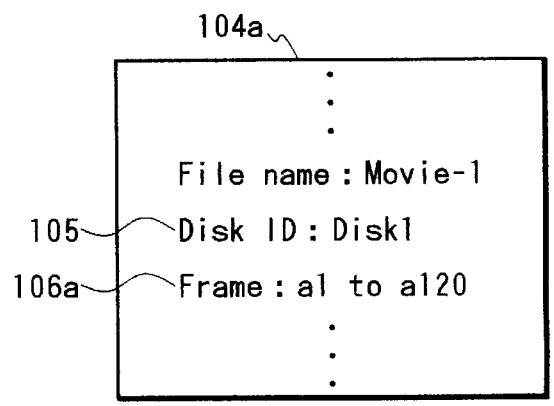
FIGS. 23A and 23B illustrate contents of the catalog file 26 of the motion picture data 101.
Figure 23B:
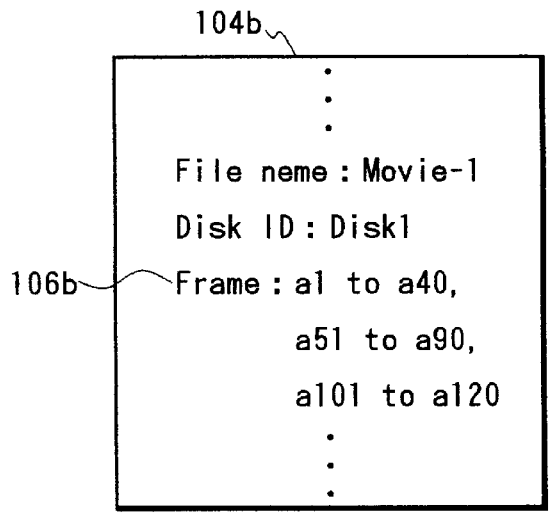

FIGS. 23A and 23B illustrate the contents of the catalog file 26 of the motion picture data 101. In FIGS. 23A and 23B, numeral 104a denotes an abstract of the description on the motion picture data 101 of the catalog file, numeral 105 denotes a backup disk ID and a file path name shown by 39 in FIG. 3 and numeral 106a denotes a reproduction frame range shown by 42 in FIG. 3.

The frames a41 to a50 and the frames a91 to a100 of the motion picture data 101 are deleted from the reproduction range. FIG. 22B shows a data structure when they are deleted from the reproduction range. When the motion picture data is compressed in the compression system having the correlation between frames, the compression system is converted at the boundary of the removal range as explained in FIGS. 16A through 19C. The reproduction frame range 106b of the catalog file 26 is updated to three portions, that is, the frames a1 to a40, a51 to a90 and a101 to a120 as shown by 104b in FIG. 23B.

As shown in FIG. 22B, the main data 102 are all stored in the optical disk. When the data is reproduced, the access information 32 of the catalog file 26 is retrieved as shown in the step S21 of the flowchart of FIG. 8A so that only the frames a1 to a40, a51 to a90 and a101 to a120 are reproduced. As shown in the step S26, since the main data is transferred simultaneously with the reproduction, the data is stored in the HDD 4 as shown by 103 in FIG. 22C so that the storage capacity of the HDD 4 may be effectively used. At the next reproduction, the main data 103 stored in the HDD 4 is used so that the edited data may be immediately reproduced.

FIGS. 24A and 24B illustrate data structures when a41 to a100 of the motion picture data 101 of FIGS. 22A to 22C are extracted and only the extracted range is reproduced. When the motion picture data is compressed in the compression system having the correlation between frames, the compression system is converted at the frames at the boundary of the deletion range as explained in FIGS. 16A through 19C. The catalog file 26 is updated as shown by 104c in FIG. 25.

Figure 25:
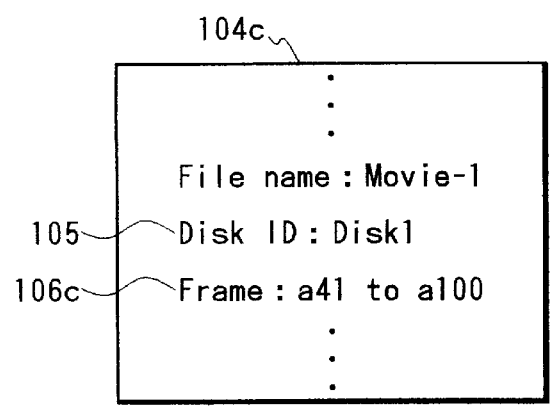
FIG. 25 illustrates a content of the catalog file 26.

FIG. 25 illustrates a content of the catalog file 26. The reproduction frame range 106c of the extracted portion is described. The source motion picture data is converted and stored in the optical disk 19 as shown by 107 in FIG. 24A, and when the data is to be reproduced, the access information 32 of the catalog file 26 is retrieved as shown in the step S21 of the flowcharts of FIGS. 7A through 8B so that only the frames a41 to a100 are reproduced. As shown in the step S26, since the main data is transferred to the HDD 4 simultaneously with the reproduction, the data is stored in the HDD 4 as shown by 108 in FIG. 24B so that the storage capacity of the HDD may be used effectively. At the next reproduction, since the main data stored in the HDD 4 is used, the edited data may be immediately reproduced.

Figure 26:
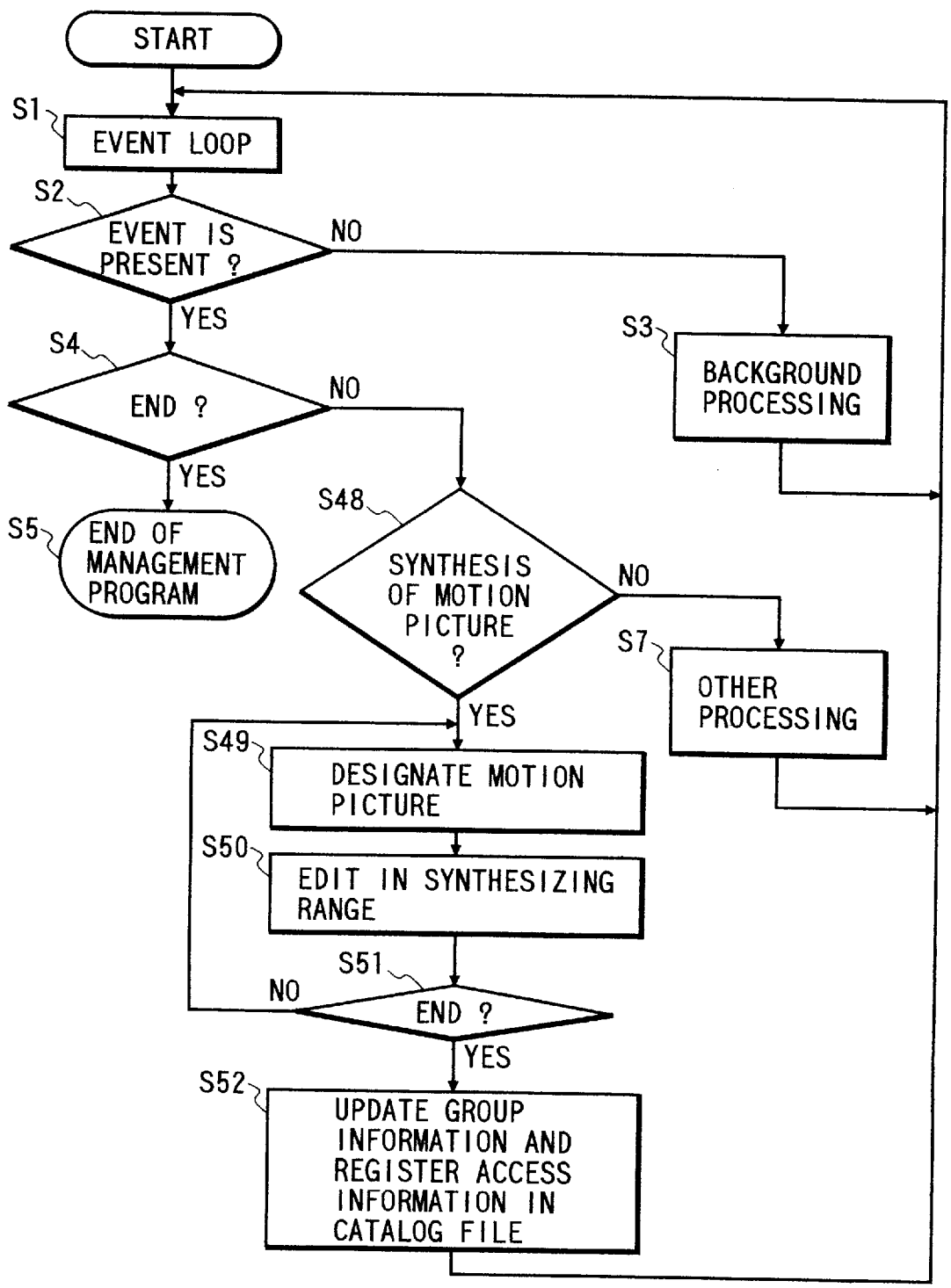
FIG. 26 shows a flowchart of a process for combining at least a portion of a plurality of motion picture data.

FIG. 26 shows a flowchart of a process to combine at least a portion of a plurality of motion picture data. Whether the event occurred is the combination of the motion picture or not is determined (step S48), and if it is the combination of the motion picture, the process proceeds to a step S49, and if it is not the combination of the motion picture, other process is conducted in the step S7 and the process returns to the event loop.

In the step S49, one of the plurality of motion picture data to be combined is designated, a portion of the motion picture data is deleted or extracted by the edition shown in FIGS. 20A and 20B and the frame range for the combination is designated (step S50). As explained in FIGS. 20A and 20B, the data compression system is converted, the catalog file is updated and after the completion of the edition of all data to be combined (step S51), the file path name, the backup disk ID and the reproduction frame range are registered in the catalog file 26 as the access information 32 in the attribute information of the combined motion picture data in order to combine the plurality of edited data, and the group information is updated to associate the combined data with the source motion picture data (step S52).

FIGS. 27A to 27C illustrate data structures when at least a portion of a plurality of motion picture data is combined. The motion picture data 112 of FIG. 22A and the motion picture data 13 of FIG. 27B may be in different optical disks. The frames b1 to b40 of the motion picture data 112 of FIG. 27A and the addresses c51 to c80 of the motion picture data 113 of FIG. 27B are combined to prepare new motion picture data of FIG. 27C.

FIGS. 28A and 28B illustrate the catalog file when the combined data of FIGS. 27A to 27C is prepared. In FIG. 28A, numeral 115a denotes an abstract of the catalog file 26 before the combined data is prepared, numeral 116 denotes the backup disk ID and the file path name of the motion picture data 112, numeral 117 denotes the reproduction frame range, numeral 118a denotes the group information, numeral 119 denotes the backup disk ID and the file path name of the motion picture data 113, numeral 121 denotes the reproduction frame range, and numeral 122a denotes the group information. The group information 118a and 122a have no description and they are independent data from each other.

In FIG. 28B, numeral 115b denotes an abstract of the catalog file 26 after the preparation of the combined data. The group information of the motion picture data 112 is updated as shown by 118b and the group information 122b of the motion picture data 113 is updated as shown by 122b, and the description on the newly combined motion picture data is added.

Numeral 123 denotes the file path name of the motion picture data 114, numeral 124a denotes the backup disk ID of the source motion picture data 112, numeral 125a denotes the reproduction frame range to be combined from the source motion picture data 112, numeral 124b denotes the backup disk ID of the source motion picture data 113, numeral 125b denotes the reproduction frame range to be combined from the source motion picture data 113, and numeral 126 denotes the group information of the motion picture data 114.

As shown in FIGS. 27A to 27C, the main data of the motion picture data 112 and 113 are recorded on the optical disk 19 after the conversion of the compression system to extract the reproduction frame range. When the combined data is reproduced, the access information 32 of the catalog file 26 is retrieved as shown in the step S21 of the flowcharts of FIGS. 7A through 8B so that the frames b1 to b40 of the motion picture data 112 and the frames c51 to c80 of the motion picture data 113 described in the reproduction frame ranges 125a and 125b of the abstract 115b of the catalog file of FIGS. 28A and 28B can be continuously reproduced.

As shown in the step S26 of FIGS. 7A through 8B, since the main data is transferred to the HDD 4 simultaneously with the reproduction, the data is stored in the HDD 4 as shown by 114 in FIG. 27C. At the next reproduction, since the main data stored in the HDD 4 is used, the combined data may be immediately reproduced.

The combined main data need not be stored in the optical disk 19 so that the capacity occupation of the optical disk 19 is avoided and a plurality of combined data may be prepared. Since the combined data is stored in the HDD 4, the combined main data may be readily stored in the optical disk 19 as required. Since the file path names are described in the group information 118b, 122b and 126 of the motion picture data and they are correlated to each other, when any one of the data is subsequently selected, other data is transferred to the HDD 4 after the reproduction of the designated data as shown in the step S30 of FIG. 7B and the step S36 of FIG. 9 so that the reproduction is permitted subsequently. The management program 34 has the following additional functions.

(1) Addition and display of associated information

Figure 29:
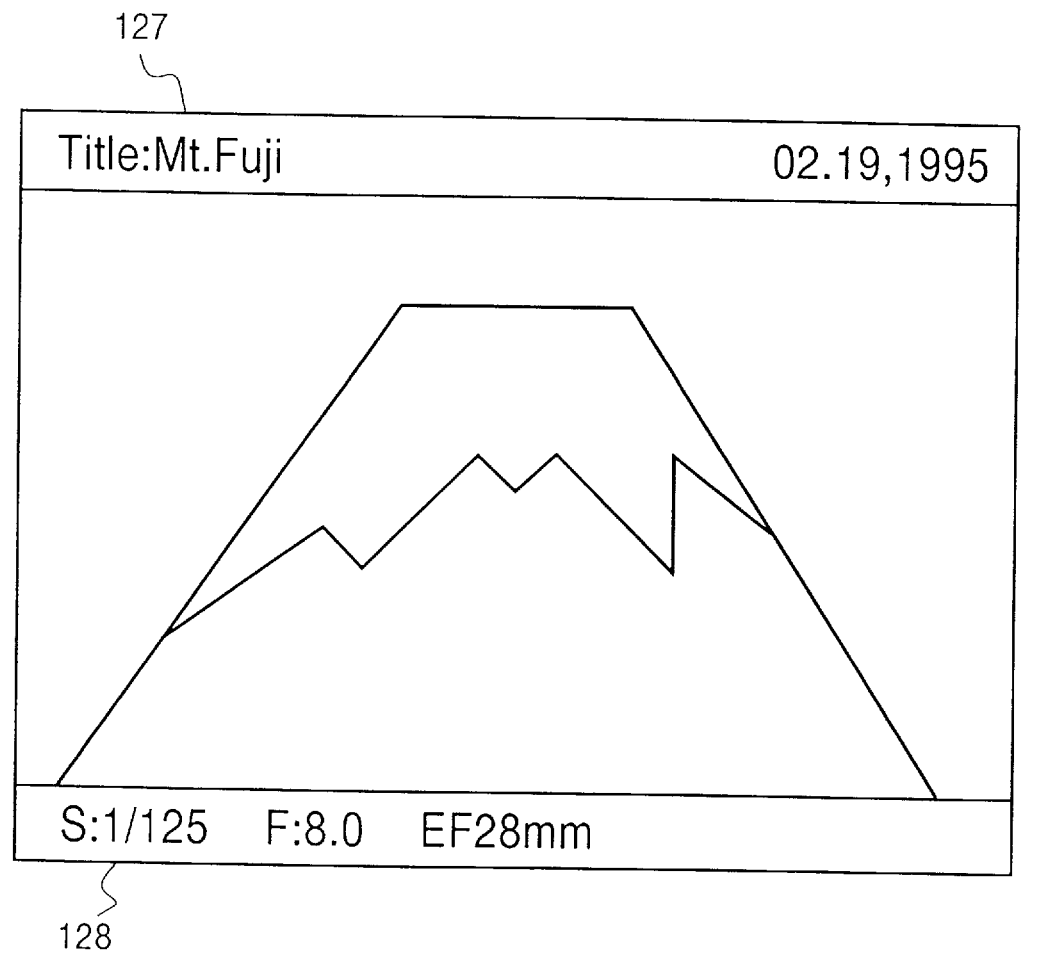

When the image data is selected, the associated information retrieval/display means 50 of FIG. 4 may extract the associated information 29 in the catalog file 26, display it together with the image, connect the digital camera through the digital camera I/O interface 3, send the associated information to the camera through the interface 3 and set the digital camera to the same image pickup condition by the camera setting means 49. FIG. 29 illustrates the image pickup condition of the digital camera. In FIG. 29, numerals 127 and 128 denote associated information, numeral 127 denotes the image data title and the image pickup date and time, and numeral 128 denotes the image pickup condition and the lens used.

(2) Group management of multimedia data

By the group data control means 51 of FIG. 4, the user may group the multimedia data into hierarchal folders. One multimedia data may be grouped into a plurality of groups.

Figure 30A:
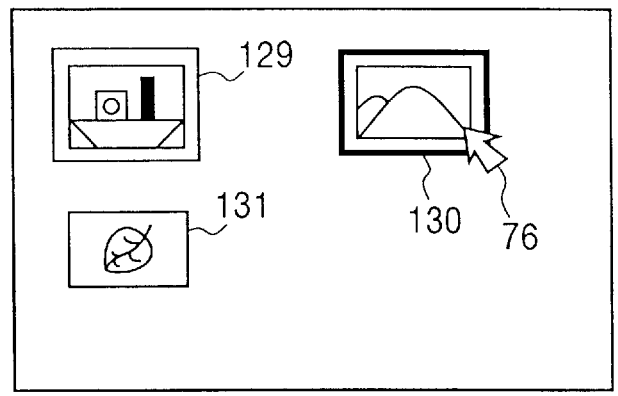
FIGS. 30A to 30C illustrate index images grouped by group information.
Figure 30B:
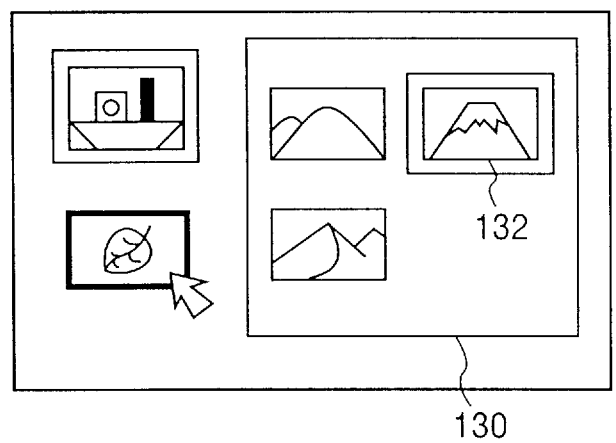
Figure 30C:
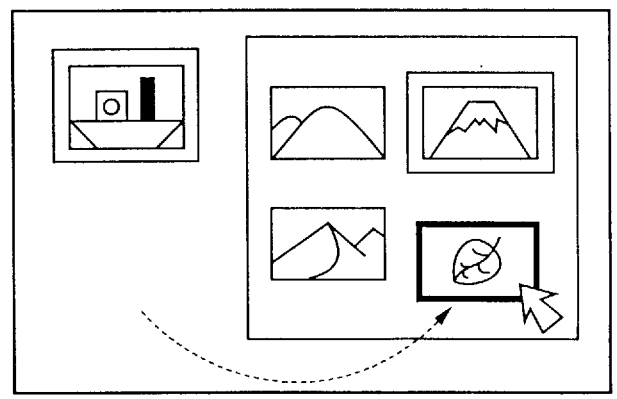

FIGS. 30A to 30C illustrates the index images grouped by the group information. In FIG. 30A, numeral 76 denotes a cursor by the input means of the personal computer 21, numeral 129 denotes a "ship" group, numeral 130 denotes a "mountain" group, and numeral 131 denotes a "leaf" index image. When the "mountain" group 130 is selected by the cursor 76 of the input means, the index images belonging to the "mountain" group are displayed as shown in FIG. 30B. In FIG. 30B, numeral 132 denotes a "Mt. Fuji" group. The group may have multihierarchy. When an image 131 of the "leaf" is to be entered in the "mountain" group 130, the image 131 of the "leaf" is moved into the "mountain" group 123 by the cursor 76 of the input means. As shown in the step S30 of FIG. 7B and the step S36 of FIG. 9, when any one of the data associated by the group information of the catalog file 26 is reproduced, other data is transferred to the HDD 4 so that when the other data in the group is to be reproduced, it may be immediately reproduced.

(3) Addition of annotation information to image data

The annotation (description) of sound or text may be added to the image data. The annotation control means 52 of FIG. 4 reads and writes the annotation information 30 of the catalog file 30 through the catalog file retrieval/edit means 45 to simultaneously reproduce and display the sound data and the text data associated with the image data.

Figure 31:
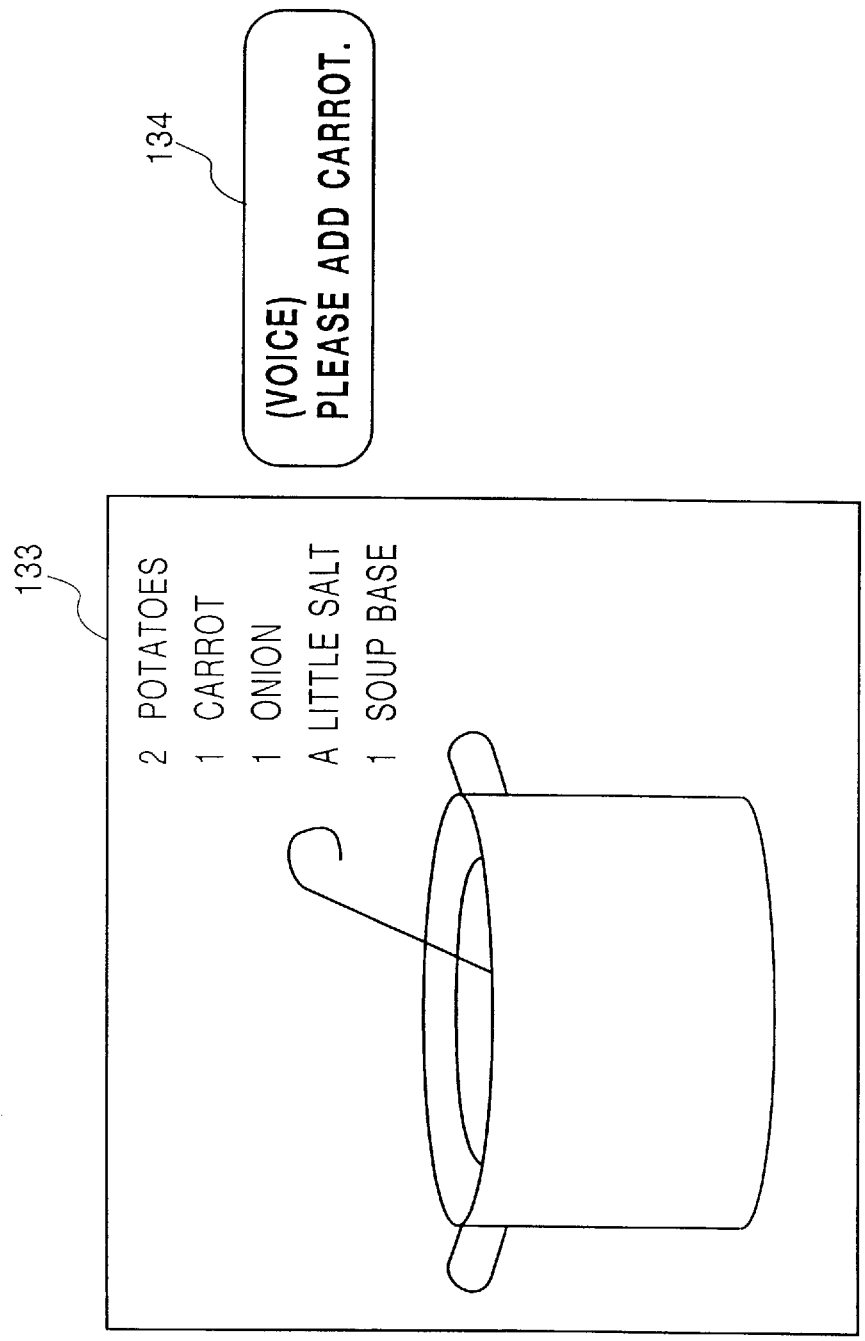
FIG. 31 illustrates simultaneous display or reproduction of sound.

FIG. 31 illustrates the simultaneous reproduction or display of the sound data and the text data associated with the image data. In FIG. 31, numeral 133 denotes a status of the simultaneous display of the test annotation data with the main image data. Numeral 134 denotes a status of the reproduction of the sound annotation data.

Other Embodiments

The present invention may be applied to a system comprising a plurality of units or to an apparatus comprising one unit.

A software program code for implementing the functions of the above embodiments may be supplied to a computer in an apparatus or system connected with various devices to operate the devices to attain the functions of the above embodiments and the devices may be operated in accordance with the program stored in the computer (CPU or MPU) of the system or apparatus, and it is within the scope of the present invention.

In this case, the software program code itself attains the functions of the above embodiments and the program per se and means to supply the program code to the computer such as a storage medium containing such program constitute the present invention.

The storage medium for storing such program may be a floppy disk, a hard disk, an optical disk, a magneto-optical disk, a CD-ROM, a magnetic tape, a non-volatile memory card or a ROM.

Further, the functions of the above embodiments are attained by executing the program code supplied to the computer as well as by the cooperation of the program code with an OS (operating system) running on the computer or other application software. In such a case, such program case is included in the embodiments of the present invention.

The supplied program code may be stored in a memory an extended function board of the computer or an extended functional unit connected to the computer and the CPU on the extended function board or the extended functional unit executes a portion or all of the process to attain the functions of the above embodiments. Such implementation is within the scope of the present invention.

What is claimed is:

1. A filing apparatus comprising:

first storage means for storing an image;

second storage means having a faster access speed than that of said first storage means;

retrieval information storage means for storing retrieval information for retrieving images stored in said first and second storage means; and control means for transferring the image stored in said second storage means to said first storage means in response to reading of the image from said first storage means using the retrieval information.

2. A filing apparatus according to claim 1 wherein the image read from said first storage means is stored in said second storage means in accordance with the control by said control means.

3. A filing apparatus according to claim 1 wherein said control means transfer the images stored in said storage means in the descending order of elapse time from the previous access.

4. A filing apparatus according to claim 1 wherein the retrieval information is multi-image based on the images stored in said first and second storage means.

5. A filing apparatus according to claim 4 wherein said read instruction is an image selection instruction to the multi-image.

6. A filing apparatus according to claim 1 wherein said first storage means comprises a plurality of storage media used by switching one by one.

7. A filing apparatus according to claim 6 further comprising inform means for informing, when image corresponding to the retrieval information is not stored in any of the record medium the plurality of record media switched for use and said second storage means, a particular record medium other than the record medium switched for use which stores the image corresponding to the retrieval information.

8. A filing apparatus according to claim 6 wherein said storage media are optical disks.

9. A filing apparatus according to claim 1 wherein said second storage means is a hard disk.

10. A filing apparatus according to claim 1 wherein said image is inputted from a camera.

11. A filing apparatus according to claim 10 wherein the retrieval information is formed from the image upon input thereof.

* * * * *